(12) United States Patent
Bergström et al.

(10) Patent No.: US 10,912,001 B2
(45) Date of Patent: Feb. 2, 2021

(54) METHOD FOR SELECTING AN ACCESS NETWORK BASED ON CARRIER AGGREGATION INFORMATION

(71) Applicant: Telefonaktiebolaget LM Ericsson (publ), Stockholm (SE)

(72) Inventors: Mattias Tan Bergström, Stockholm (SE); Gunnar Mildh, Sollentuna (SE); Magnus Stattin, Upplands Väsby (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 888 days.

(21) Appl. No.: 14/917,523

(22) PCT Filed: Sep. 5, 2014

(86) PCT No.: PCT/SE2014/051025
§ 371 (c)(1),
(2) Date: Mar. 8, 2016

(87) PCT Pub. No.: WO2015/038049
PCT Pub. Date: Mar. 19, 2015

(65) Prior Publication Data
US 2016/0219477 A1  Jul. 28, 2016

Related U.S. Application Data

(60) Provisional application No. 61/875,934, filed on Sep. 10, 2013.

(51) Int. Cl.
*H04W 36/14* (2009.01)
*H04W 48/18* (2009.01)
(Continued)

(52) U.S. Cl.
CPC ........... *H04W 36/14* (2013.01); *H04W 36/22* (2013.01); *H04W 48/16* (2013.01); *H04W 48/18* (2013.01);
(Continued)

(58) Field of Classification Search
CPC . H04W 48/08; H04W 48/16; H04W 52/0209; H04W 52/0274; H04W 84/045;
(Continued)

(56) References Cited

U.S. PATENT DOCUMENTS 8,830,858 B2 * 9/2014 Macias ................. H04W 48/18
370/252
10,560,882 B2 * 2/2020 Vrzic ................. H04W 36/0066
(Continued)

FOREIGN PATENT DOCUMENTS

WO  2011159215 A1  12/2011

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.6.0, Jun. 2013, 1-209.
(Continued)

*Primary Examiner* — Yemane Mesfin
*Assistant Examiner* — Mon Cheri S Davenport
(74) *Attorney, Agent, or Firm* — Murphy, Bilak & Homiller, PLLC

(57) ABSTRACT

Mobile devices, network nodes and methods of operating the same According to one aspect, there is provided a method of operating a mobile device that is configured for use in a first radio access network that uses a first radio access technology and a second radio access network that uses a second, different, radio access technology, the mobile
(Continued)

device aggregating a plurality of carriers in the first radio access network, the method comprising obtaining information for, or pertaining to, one or more of the plurality of carriers in the first radio access network (101); and processing the obtained information for a single carrier to determine an action for the mobile device to take with respect to the second radio access network (103).

20 Claims, 6 Drawing Sheets

(51) Int. Cl.
  *H04W 48/16* (2009.01)
  *H04W 36/22* (2009.01)
  *H04W 76/10* (2018.01)
  *H04W 88/06* (2009.01)
  *H04W 36/00* (2009.01)
(52) U.S. Cl.
  CPC ........ *H04W 76/10* (2018.02); *H04W 36/0069* (2018.08); *H04W 88/06* (2013.01)
(58) Field of Classification Search
  CPC . H04W 36/0066; H04W 84/12; H04W 92/20; H04W 16/14; H04W 36/14; H04W 36/30; H04W 88/06; H04W 28/0231; H04W 28/0268; H04W 28/085; H04W 36/01; H04W 48/06; H04W 48/18; H04W 4/005; H04W 52/0203; H04W 52/0219; H04W 68/005; H04W 72/0406; H04W 72/0413; H04W 72/042; H04W 72/0453; H04W 72/1247; H04W 84/042; H04W 88/10; Y02B 60/50; H04L 5/0035; H04L 1/1812; H04L 1/1861; H04L 27/0006; H04L 27/2602; H04L 27/2613; H04L 47/125; H04L 47/821; H04L 47/822; H04L 47/826; H04L 5/001; H04L 5/0057; H04L 5/0073; H04L 5/0092; H04L 5/0094; H04L 63/10; H04B 1/715; H04B 2001/7154; H04B 7/0632; H04J 11/0046
  See application file for complete search history.

(56) References Cited

U.S. PATENT DOCUMENTS

| | | | |
|---|---|---|---|
| 2011/0310753 A1 | 12/2011 | Chou et al. | |
| 2012/0140743 A1* | 6/2012 | Pelletier | H04W 72/0453 370/335 |
| 2013/0083661 A1 | 4/2013 | Gupta et al. | |
| 2013/0294415 A1* | 11/2013 | Moilanen | H04W 72/0486 370/331 |
| 2014/0079022 A1* | 3/2014 | Wang | H04W 36/22 370/331 |
| 2015/0208274 A1* | 7/2015 | Himayat | H04N 21/2365 370/230 |

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.4.0, Dec. 2011, 1-33.

3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.3.0, Jun. 2013, 1-57.

Unknown, Author, "3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.4.0, Jun. 2013, 1-34.

Unknown, Author, "Analysis of WLAN/3GPP interworking solutions", 3GPP TSG-RAN WG2 #81bis, Tdoc R2-131388, Ericsson, ST-Ericsson, Deutsche Telekom, Chicago, IL, USA, Apr. 15-19, 2013, 1-3.

Unknown, Author, "Connected mode access selection solution for WLAN/3GPP radio interworking", 3GPP TSG-RAN WG2 #81bis, Tdoc R2-131389, Ericsson, ST-Ericsson, Deutsche Telekom, Chicago, IL, USA, Apr. 15-19, 2013, 1-3.

Unknown, Author, "Desired behaviour for RAN level solutions for WLAN-3GPP Interworking", 3GPP TSG-RAN WG2 #81bis, Tdoc R2-131387, Ericsson, ST-Ericsson, Deutsche Telekom, Chicago, USA, Apr. 15-19, 2013, 1-3.

Unknown, Author, "Idle mode access selection solution for WLAN/3GPP radio interworking", 3GPP TSG-RAN WG2 #81bis, Tdoc R2-131390, Ericsson, ST-Ericsson, Deutsche Telekom, Chicago, IL, USA, Apr. 15-19, 2013, 1-4.

Unknown, Author, "Way forward for WLAN/3GPP Radio interworking", 3GPP TSG-RAN WG2 #83, Tdoc R2-132827, Ericsson, ST-Ericsson, Barcelona, Spain, Aug. 19-23, 2013, 1-8.

* cited by examiner

METHOD FOR SELECTING AN ACCESS NETWORK BASED ON CARRIER AGGREGATION INFORMATION

TECHNICAL FIELD

The technology described herein generally relates to wireless devices that support multiple radio access technologies (RATs) and that can be configured to operate in a carrier aggregation mode when using a network operating according to one of the RATs in which the wireless device concurrently uses two or more cells in the network.

BACKGROUND

The wireless local-area network (WLAN) technology known as "Wi-Fi" has been standardized by IEEE in the 802.11 series of specifications (i.e., as "*IEEE Standard for Information technology—Telecommunications and information exchange between systems. Local and metropolitan area networks—Specific requirements. Part 11: Wireless LAN Medium Access Control (MAC) and Physical Layer (PHY) Specifications*"). As currently specified, Wi-Fi systems are primarily operated in the 2.4 GHz or 5 GHz bands.

The IEEE 802.11 specifications regulate the functions and operations of the Wi-Fi access points (APs) or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies (RATs). Cellular operators that are currently serving mobile users with, for example, any of the technologies standardized by the $3^{rd}$-Generation Partnership Project 3GPP), including the radio-access technologies known as Long-Term Evolution (LTE), Universal Mobile Telecommunications System (UMTS)/Wideband Code-Division Multiple Access (WCDMA), and Global System for Mobile Communications (GSM), see Wi-Fi as a wireless technology that can provide good additional support for users in their regular cellular networks.

As used herein, the term "operator-controlled Wi-Fi" indicates a Wi-Fi deployment that on some level is integrated with a cellular network operator's existing network, where the operator's radio access network(s) and one or more Wi-Fi wireless access points may even be connected to the same core network and provide the same or overlapping services. Currently, several standardization organizations are intensely active in the area of operator-controlled Wi-Fi. In 3GPP, for example, activities to connect Wi-Fi access points to the 3GPP-specified core network are being pursued. In the Wi-Fi alliance (WFA), activities related to certification of Wi-Fi products are undertaken, which to some extent is also driven from the need to make Wi-Fi a viable wireless technology for cellular operators to support high bandwidth offerings in their networks. In these standardization efforts, the term "Wi-Fi offload" is commonly used and indicates that cellular network operators seek means to offload traffic from their cellular networks to Wi-Fi, e.g., during peak-traffic-hours and in situations when the cellular network needs to be off-loaded for one reason or another, e.g., to provide a requested quality-of-service, to maximize bandwidth, or simply for improved coverage.

Many of today's portable wireless devices (referred to hereinafter as "mobile devices", "user equipment," or "UEs") support Wi-Fi in addition to one or several 3GPP or other cellular technologies. In many cases, however, these terminals essentially behave as two separate devices, from a radio access perspective. The 3GPP radio access network and the UE-based modems and protocols that are operating pursuant to the 3GPP specifications are generally unaware of the wireless access Wi-Fi protocols and modems that may be simultaneously operating pursuant to the 802.11 specifications. Techniques for coordinated control of these multiple radio-access technologies are needed.

SUMMARY

As noted above, work has recently been started in 3GPP to enable radio interworking between 3GPP networks and WLAN to allow operators to use WLAN to complement their 3GPP networks and increase capacity, improve the user experience, etc. In particular, techniques which enable a mobile device to select the appropriate radio access network (e.g. the 3GPP network or the WLAN) are being discussed.

Different solutions for access network selection have been proposed. Some of the proposed solutions make use of indicators or other assistance information that the 3GPP network signals to the mobile devices, and the mobile devices make use of the indicators or information to select an appropriate access network from the 3GPP network and the WLAN. One example of such assistance information is 3GPP load, which is claimed to aid the mobile device in performing a better selection (also referred to as offloading) between the two types of network. The transmission of this information from a 3GPP network and a WLAN AP associated with the 3GPP network operator to a mobile device is illustrated in FIG. 2. Here, the 3GPP base station (referred to as an eNodeB or eNB in the LTE standard) broadcast its load conditions, as does the WLAN access point (AP) (assuming the AP supports Hotspot 2.0 [Hotspot 2.0 Technical Specification v1.0.0] which enables the broadcast of load information).

As an alternative to the signalling of load information, the 3GPP network can communicate values for thresholds to be used by the mobile device in the access network selection. For example, Reference Signal Received Power (RSRP) and Received Signal Strength Indicator (RSSI) thresholds (denoted RSRP_threshold and RSSI_threshold respectively) can be signalled to a UE, and the UE can perform access network selection towards the WLAN if, for example RSRP_3GPP<RSRP_threshold, and RSSI_WLAN>RSSI_threshold where RSRP_3GPP is the RSRP for signals from the 3GPP network and RSSI_WLAN is the RSSI for signals from the WLAN.

In this alternative, since the 3GPP radio access network (RAN) has knowledge of the load, the threshold values can be increased or decreased depending on the load conditions (e.g. if the 3GPP cell is loaded or highly loaded, the RSRP_threshold can be increased and/or the RSSI_threshold can be decreased in order to improve the likelihood that the UE is offloaded to the WLAN). It has also been proposed that the indicators/assistance information/thresholds/etc. can be used to perform offloading of specific traffic (known as traffic steering), e.g. the traffic in a specific bearer, traffic flow, specific types of traffic (e.g. voice, data, etc.) etc. to a different radio access network.

However, a problem with these access selection and traffic steering techniques has been identified for radio access networks that allow a mobile device to aggregate multiple cells or carriers together to increase the bandwidth available to the mobile device to transmit and/or receive data.

In LTE, a carrier aggregation (CA) feature has been standardized to allow the support for aggregating Component Carriers (CC) (also individually referred to serving cells, cells, carriers) each with bandwidths up to 20 MHz (which is the maximal LTE Release-8 carrier bandwidth). When using carrier aggregation, a mobile device is able to communicate with the network using higher data rates than is possible with a single carrier. The current LTE standard (for example as described in 3GPP TS 36.300 v11.6.0) supports the mobile device aggregating up to five carriers where each carrier is limited in the radio frequency (RF) specifications to have one of six bandwidths, namely 6, 15, 25, 50, 75 or 100 resource blocks (RBs), which corresponds to 1.4, 3, 5, 10, 15 and 20 MHz respectively). This means that carrier aggregation operation wider than 20 MHz is possible and appears as a number of LTE carriers to an LTE mobile device. An example of the carrier aggregation of five 20 MHz carriers is shown in FIG. 1.

The number of aggregated CCs as well as the bandwidth of the individual CCs may be different for the uplink (UL) and downlink (DL) directions.

In LTE each of the component carriers aggregated by a UE are denoted as either a primary cell (PCell) or a secondary cell (SCell). The term Serving Cell comprises both PCell and SCells. Each cell that the UE is configured to use is, to that UE, a "serving cell". The UE can have multiple serving cells; one PCell and zero or more SCells. The PCell is the cell which e.g. carries control signalling etc, the SCells are like additional resources that are configured for the UE "on demand". One example of a difference between the UE's PCell and a UE's SCell is that the UE does not perform Radio Link Monitoring (RLM) on the SCell (according to the current specification). The cell or carrier that is the primary cell is UE-specific and is the cell that provides the control signalling and other important signalling to the UE. The component carrier configured as the PCell is the primary CC, whereas all other aggregated component carriers are SCells.

During initial access by the UE to the network, an LTE UE has only one serving cell configured (this is the PCell). Upon successful connection to the network a UE may— depending on e.g. its own and the network capabilities—be configured with additional serving cells in the UL and/or DL. The configuration that the UE uses is determined based on radio resource control (RRC) signalling and procedures. Due to the relatively 'heavy' signalling and rather slow speed of RRC signalling, it is envisioned that a UE may be configured with multiple CCs even though not all of them are being used. As a result, the concept of 'cell activation' has been introduced at the MAC level where serving cells can be dynamically activated and deactivated based on the current needs of the UE and/or network (e.g. a certain bandwidth required to transmit data).

As noted above, some of the proposed access network selection and traffic steering techniques make use of information that the UE has received from the 3GPP network. These techniques are adequate when the information relates to a single cell in the 3GPP network that the UE is camped on or connected to, but in the case of a UE that is using carrier aggregation, the UE may receive said information for multiple cells. In this case the information provided to the UE may be ambiguous (as the information signalled by the different cells is not necessarily the same) which could lead to the UE behaving unexpectedly. Furthermore, the provided information does not take into account the potential capability for the UE to be served by another cell or more than one cell. Hence, improper or inappropriate access network selection decisions may be taken by the UE which can degrade system performance, quality of service and user experience.

Thus, techniques are described herein to enable proper or more appropriate selection of an access network and/or steering of traffic in a 3GPP/WLAN or other 3GPP/non-3GPP (e.g. GSM) heterogeneous network scenario where the mobile device and the 3GPP network support carrier aggregation. Embodiments disclose ways in which a mobile device and/or network node can consider information and/or configurations from, or pertaining to, one or more of multiple aggregated carriers (or carriers that can be aggregated by the mobile device) when performing access selection and/or traffic steering between 3GPP networks and a WLAN or non-3GPP network.

According to a first aspect there is provided a method of operating a mobile device that is configured for use in a first radio access network that uses a first radio access technology and a second radio access network that uses a second, different, radio access technology, the mobile device aggregating a plurality of carriers in the first radio access network. The method comprising the steps of obtaining information for, or pertaining to, one or more of the plurality of carriers in the first radio access network and processing the obtained information for a single carrier to determine an action for the mobile device to take with respect to the second radio access network.

According to a second aspect, there is provided a method of operating a mobile device where the mobile device is configured for use in a first radio access network that uses a first radio access technology and a second radio access network that uses a second, different, radio access technology, the mobile device being capable of aggregating a plurality of carriers in the first radio access network. The method comprises obtaining information for, or pertaining to, two or more carriers in the first radio access network and processing the obtained information to determine an action for the mobile device to take with respect to the second radio access network.

According to a third aspect, there is provided a mobile device for use in a first radio access network that uses a first radio access technology and a second radio access network that uses a second, different, radio access technology, the mobile device aggregating a plurality of carriers in the first radio access network is disclosed. The mobile device comprises a processing module. The processing module is configured to obtain information for, or pertaining to, one or more of the plurality of carriers in the first radio access network and to process the obtained information for a single carrier to determine an action for the mobile device to take with respect to the second radio access network.

According to a fourth aspect, there is provided a mobile device for use in a first radio access network that uses a first radio access technology and a second radio access network that uses a second, different, radio access technology. The mobile device is configured to selectively aggregate a plurality of carriers in the first radio access network. The mobile device comprises a processing module configured to obtain information for, or pertaining to, two or more carriers in the first radio access network and to process the obtained information to determine an action for the mobile device to take with respect to the second radio access network.

According to a fifth aspect, there is provided a method in a network node of a first radio access network that uses a first radio access technology, for enabling a mobile device to selectively connect to, and/or steer traffic to, the first radio access network and a second radio access network (20) that uses a second, different, radio access technology, the mobile device being capable of aggregating a plurality of carriers in the first radio access network. The method comprises determining, for the mobile device, one or more threshold values and/or conditions for the mobile device, the one or more threshold values and/or conditions being for use in determining how the mobile device should handle connections to the second radio access network and being determined based on information for, or pertaining to, two or more carriers or cells in the first radio access network. The method then comprises sending the one or more threshold values and/or conditions to the mobile device.

In a sixth aspect, there is provided a network node for use in a first radio access network that uses a first radio access technology for enabling a mobile device to selectively connect to, and/or steer traffic to, the first radio access network and a second radio access network that uses a second, different, radio access technology, the mobile device being capable of aggregating a plurality of carriers in the first radio access network. The network node comprises a processing module configured to determine, for the mobile device, one or more threshold values and/or conditions for use in determining how the mobile device should handle connections to the second radio access network the one or more threshold values and/or conditions being determined based on information for, or pertaining to, two or more carriers or cells in the first radio access network. The network node further comprises a transceiver module configured to transmit the one or more threshold values and/or conditions to the mobile device.

In a seventh aspect, there is provided a method in a network node of a first radio access network that uses a first radio access technology for enabling a mobile device to selectively connect to, and/or steer traffic to, the first radio access network and a second radio access network that uses a second, different, radio access technology, the mobile device aggregating a plurality of carriers in the first radio access network. The method comprises obtaining information for, or pertaining to, one or more of the plurality of carriers in the first radio access network, and processing the obtained information for a single carrier to determine an action for the mobile device to take with respect to the second radio access network.

In an eighth aspect, there is provided a method in a network node of a first radio access network that uses a first radio access technology for enabling a mobile device to selectively connect to, and/or steer traffic to, the first radio access network and a second radio access network that uses a second, different, radio access technology, the mobile device being capable of aggregating a plurality of carriers in the first radio access network. The method comprises obtaining information for, or pertaining to, two or more carriers in the first radio access network and processing the obtained information to determine an action for the mobile device to take with respect to the second radio access network.

According to a ninth aspect, there is provided a network node for use in a first radio access network that uses a first radio access technology, for enabling a mobile device to selectively connect to, and/or steer traffic to, the first radio access network and a second radio access network that uses a second, different, radio access technology, the mobile device aggregating a plurality of carriers in the first radio access network. The network node comprises a processing module configured to obtain information for, or pertaining to, one or more of the plurality of carriers in the first radio access network and to process the obtained information for a single carrier to determine an action for the mobile device to take with respect to the second radio access network.

In a tenth aspect, there is provided a network node for use in a first radio access network that uses a first radio access technology, for enabling a mobile device to selectively connect to, and/or steer traffic to, the first radio access network and a second radio access network that uses a second, different, radio access technology, the mobile device being capable of aggregating a plurality of carriers in the first radio access network. The network node comprises a processing module configured to obtain information for, or pertaining to, two or more carriers in the first radio access network and to process the obtained information to determine an action for the mobile device to take with respect to the second radio access network.

BRIEF DESCRIPTION OF THE DRAWINGS

Features, objects and advantages of the presently disclosed techniques will become apparent to those skilled in the art by reading the following detailed description where references will be made to the appended figures in which.

DETAILED DESCRIPTION

Figure 1:
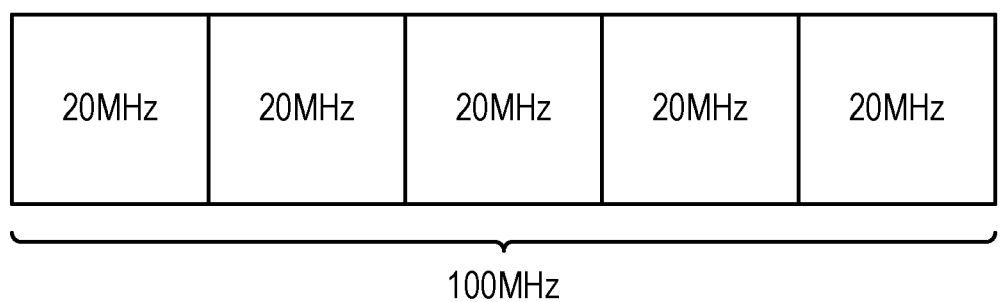
FIG. 1 shows an example of carrier aggregation.
Figure 2:
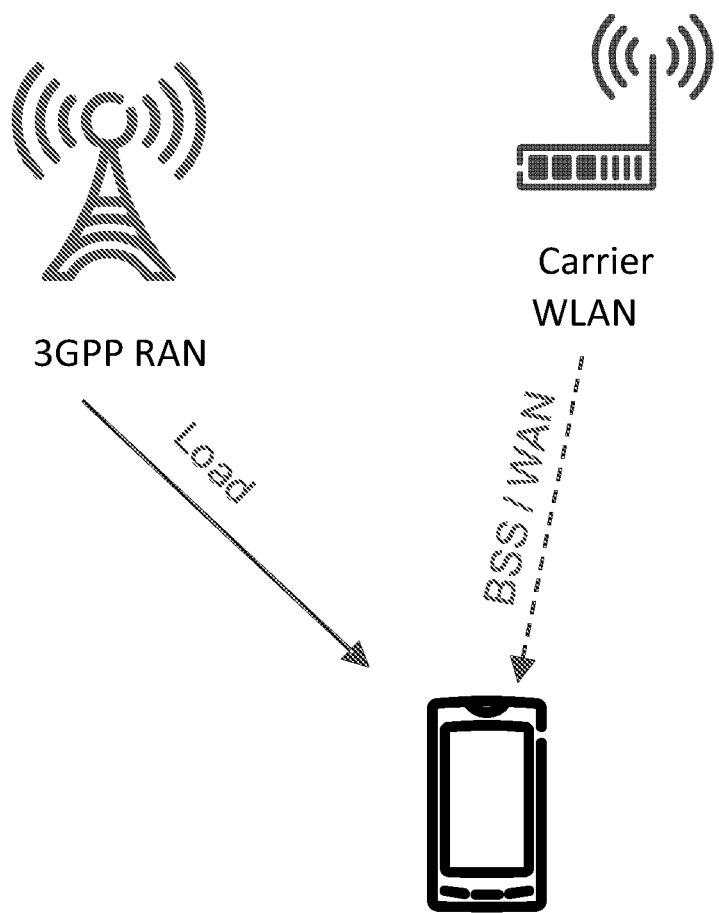
FIG. 2 illustrates the transmission of load information from 3GPP and WLAN networks to facilitate access network selection.

In the discussion that follows, specific details of particular embodiments are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers.

Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present embodiments may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "mobile devices" or "UEs," which is the 3GPP term for end user wireless devices. It should be appreciated, however, that the techniques and apparatus described herein are not limited to 3GPP UEs, but are more generally applicable to end user wireless devices (e.g., portable cellular telephones, smartphones, wireless-enabled tablet computers, etc.) that are useable in cellular systems and that are capable of communicating with a radio access network (RAN) using multiple carriers or cells (e.g. known as a carrier aggregation (CA) mode in LTE). It should also be noted that the current disclosure relates to end user wireless devices that support both a wide-area cellular technology, such as any of the wide-area radio access standards maintained by 3GPP, and a wireless local area network (WLAN) technology, such as one or more of the IEEE 802.11 standards. End user devices are referred to in Wi-Fi document as "stations," or "STA"—it should be appreciated that the term "UE" as used herein should be understood to refer to a STA, and vice-versa, unless the context clearly indicates otherwise. It should also be noted that the current disclosure also relates to end user wireless devices that support both a wide-area cellular technology, such as any of the wide-area radio access standards maintained by 3GPP, and a non-3GPP standardized RAT, such as the Global System for Mobile Communications (GSM), and for which improvements to the selection of the access network and/or steering of traffic are desired.

As used herein, a "base station" comprises in a general sense any node transmitting radio signals in the downlink (DL) to a mobile device and/or receiving radio signals in the uplink (UL) from the mobile device. Some example base stations are eNodeB, eNB, Node B, macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may itself be capable of carrier aggregation. It may also be a single-radio access technology (RAT), multi-RAT, or multi-standard node, e.g., using the same or different base band modules for different RATs. Although the embodiments described below refer to a macrocell base station, it will be appreciated that the teachings of this application are applicable to any type of base station (e.g. femtocell base stations, picocell base stations, microcell base station, etc.) whether deployed in a homogeneous or heterogeneous network.

The signalling described is either via direct links or logical links (e.g. via higher layer protocols and/or via one or more network nodes). For example, signalling from a coordinating node may pass another network node, e.g., a radio node.

Figure 3:
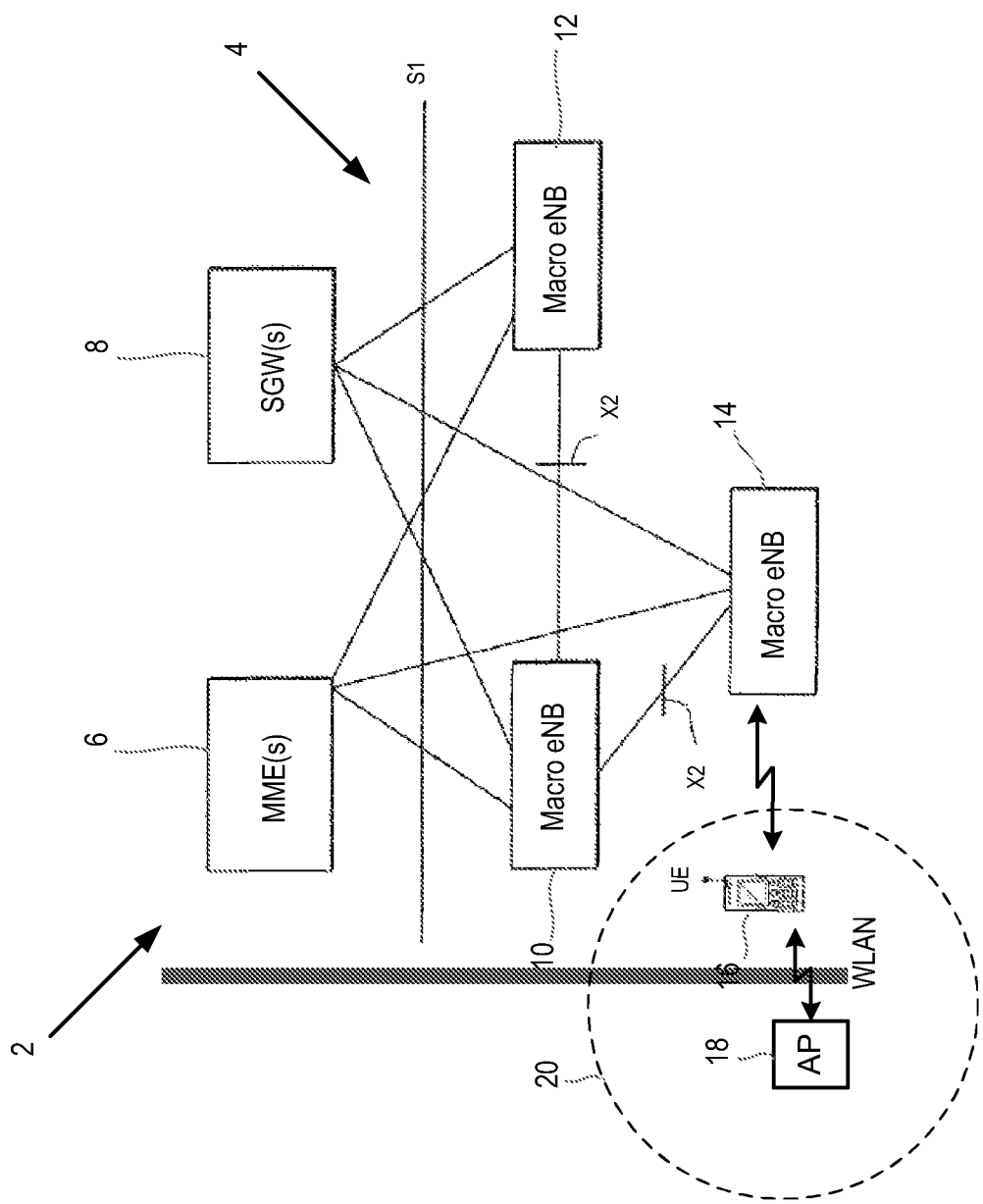
FIG. 3 is a non-limiting example block diagram of an LTE cellular communications network and a WLAN access point.

FIG. 3 shows an example diagram of an LTE-based communications system 2 and a wireless local area network (WLAN) access point (AP). Nodes in the core network 4 include one or more Mobility Management Entities (MMEs) 6, a key control node for the LTE access network, and one or more Serving Gateways (SGWs) 8 which route and forward user data packets while and acting as a mobility anchor. They communicate with base stations 10, 12, 14, referred to in LTE as eNBs, over an interface, for example an S1 interface. The eNBs in this illustrated system 2 are macro eNBs 10, 12, 14 that communicate with each other over an interface, for example an X2 interface. The S1 interface and X2 interface are defined in the LTE standard. Each base station 10, 12, 14 defines one or more cells (carriers) that UEs 16 can use to communicate with the system 2. The UE 16 can receive downlink data from and send uplink data to one or more cells (provided by one or more of the base stations 10, 12, 14), with that cell/base station 10, 12, 14 being referred to as the serving cell/serving base station of the UE 16. An access point (AP) 18 for a wireless local area network (WLAN) 20 is also shown in FIG. 3. The WLAN 20 is provided by the network operator of the system 2 shown in FIG. 3, and thus the AP 18 provides the UE 16 with an alternative access network for transmitting data to and receiving data from the core network 4 of the system 2. Although the WLAN is primarily described herein as a Wi-Fi network, it will be appreciated that the WLAN may also or alternatively operate according to another short-range wireless communication technology, such as WiMAX. The general term "network node" as used herein, refers to nodes in the RAN, such as base stations, nodes in the core network, such as SGWs and MME, as well as nodes in other types of networks, such as radio network controllers, RNCs, etc.

Figure 4:
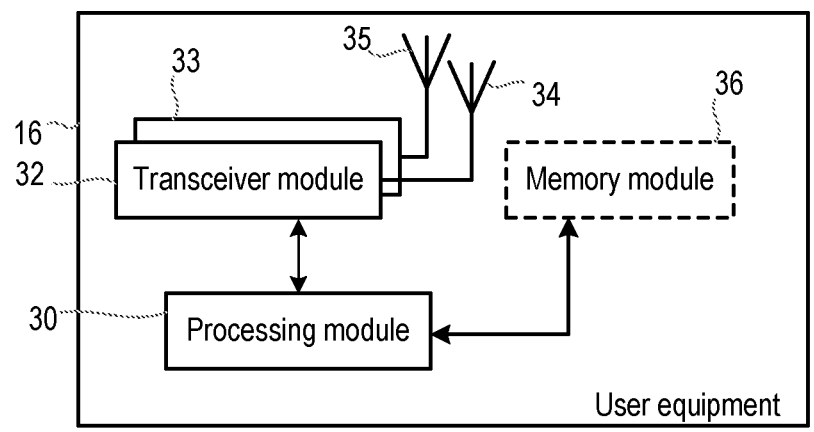
FIG. 4 is a block diagram of a mobile device according to an embodiment.

FIG. 4 shows a user equipment (UE) 16 that can be used in one or more of the non-limiting example embodiments described. The UE 16 comprises a processing module 30 that controls the operation of the UE 16. The processing module 30 is connected to a plurality of transceiver modules 32, 33 with associated antenna(s) 34, 35 which are used to receive and transmit signals to/from a base station 10, 12, 14 in the network 2 according to respective radio access technology protocols. One of the transceiver modules 32, 33 is configured according to a 3GPP standard that allows for carrier aggregation, such as LTE, WCDMA, UMTS, etc. In some embodiments, the other transceiver module 32, 33 is configured according to a WLAN standard, such as Wi-Fi (based on the IEEE 802.11 standard), WiMax (based on the 802.16 family of standards), etc. In other embodiments, the other transceiver module 32, 33 is configured according to a non-3GPP standard, such as GSM, etc. In some embodiments, the UE 16 can comprise transceiver modules 32, 33 configured to operate according to each of a 3GPP, WLAN and non-3GPP radio access technology protocol.

The user equipment 16 also comprises a memory module 36 that is connected to the processing module 30 and that stores program and other information and data required for the operation of the UE 16.

Figure 5:
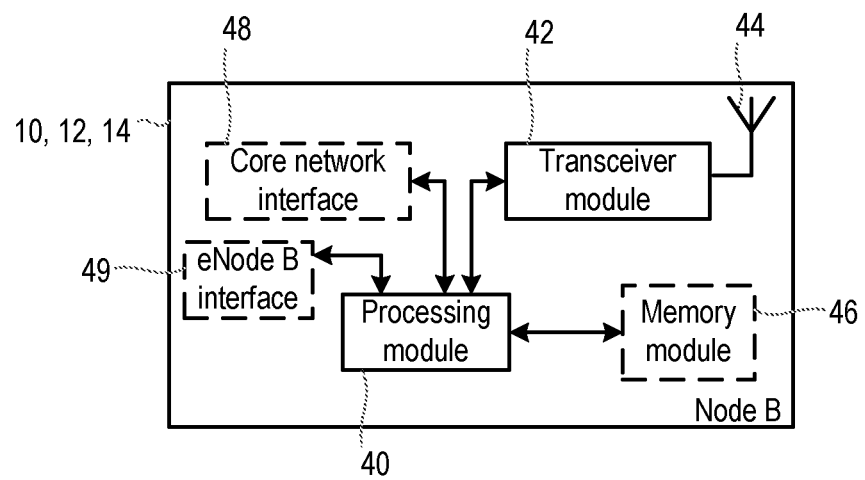
FIG. 5 is a block diagram of a base station according to an embodiment.

FIG. 5 shows a base station 10, 12, 14 (for example an eNode B) that can be used in example embodiments described. The base station 10, 12, 14 comprises a processing module 40 that controls the operation of the base station 10, 12, 14. The processing module 40 is connected to a transceiver module 42 with associated antenna(s) 44 which are used to transmit signals to, and receive signals from, user equipments 16 in the network 2. The base station 10, 12, 14 also comprises a memory module 46 that is connected to the processing module 40 and that stores program and other information and data required for the operation of the base station 10, 12, 14. The base station 10, 12, 14 also includes components and/or circuitry 48 for allowing the base station 10, 12, 14 to exchange information with other base stations 10, 12, 14 (for example via an X2 interface) and components and/or circuitry 49 for allowing the base station 10, 12, 14 to exchange information with nodes in the core network 4 (for example via the S1 interface).

Figure 6:
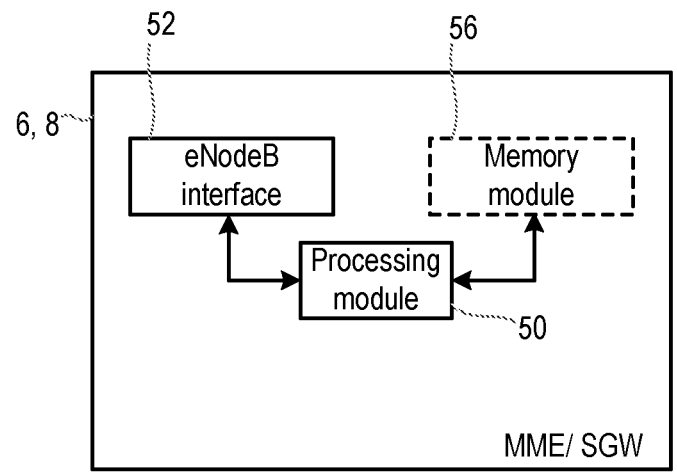
FIG. 6 is a block diagram of a network node according to an embodiment.

FIG. 6 shows a network node 6, 8 that can be used in the example embodiments described. The node 6, 8 comprises a processing module 50 that controls the operation of the node 6, 8. The processing module 50 is connected to components and/or circuitry 52 for allowing the node 6, 8 to exchange information with the base stations 10, 12, 14 with which it is associated (which is typically via the S1 interface). The node 6, 8 also comprises a memory module 56 that is connected to the processing module 50 and that stores program and other information and data required for the operation of the node 6, 8. The network node can be a core network node, such as an S-GW or MME, or a node in another type of network, such as a radio network controller, RNC.

Figure 7:
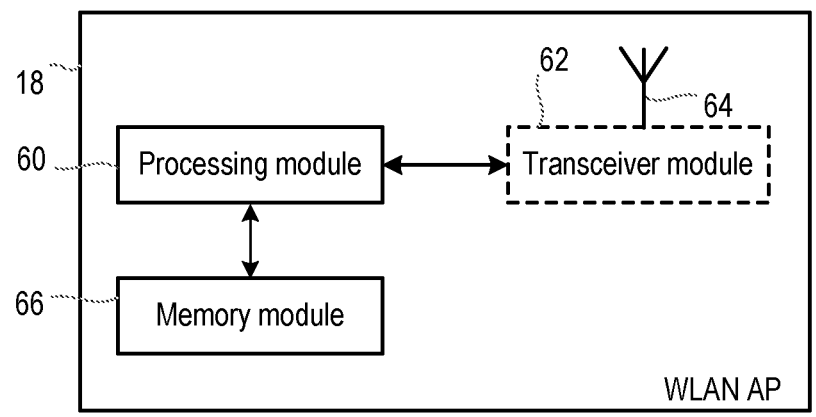
FIG. 7 is a block diagram of an access point according to an embodiment.

FIG. 7 shows an access point (AP) 18 that can be used in the example embodiments described. The AP 18 comprises a processing module 60 that controls the operation of the AP 18. The processing module 60 is connected to a transceiver module 62 and associated antenna 64 which are used to transmit signals to, and receive signals from, UEs 16 and other electronic devices having suitable transceiver modules and antennas. The transceiver module 62 is configured according to a WLAN standard, such as Wi-Fi, WiMax, etc.

As noted above, techniques are described herein that enable proper or more appropriate selection of an access network and/or steering of traffic in a 3GPP/WLAN or other 3GPP/non-3GPP (e.g. GSM) heterogeneous network scenario where the mobile device and the 3GPP network support carrier aggregation. Embodiments disclose ways in which a mobile device 16 and/or network node 6, 8, 10, 12, 14, can consider information and/or configurations from, or pertaining to, one or more of multiple aggregated carriers (or carriers that can be aggregated by the mobile device 16) when performing access selection and/or traffic steering between 3GPP networks and a WLAN or non-3GPP network.

In particular, techniques are provided to control how a mobile device 16 or network node (in the embodiments where the network node considers the information and/or configurations) treats or uses the information which is received from a first radio access network to determine how to the mobile device 16 is to act with respect to a second radio access network. Here, the first radio access network is a network according to a 3GPP standard that comprises multiple cells and that allows the mobile device 16 to perform carrier aggregation. As noted above, such networks include LTE networks, UMTS networks, etc. The second radio access network is a network according to a non-3GPP standard (e.g. GSM or, more preferably, a WLAN, such as a Wi-Fi or WiMAX network). In the embodiments below, the first radio access network is an LTE network and the second radio access network is a WLAN.

Although it is described below that the mobile device 16 receives broadcasted information from multiple cells/carriers, it should be appreciated that the embodiments also apply to the case when the mobile device 16 receives information regarding multiple cells by dedicated (or possibly multicast) signalling. For example, in Carrier Aggregation in LTE, the UE 16 reads system information regarding the primary cell (PCell) from a broadcast channel (e.g. the Broadcast Control Channel, BCCH), but for secondary cells (SCells) the mobile device 16 receives the system information regarding secondary cells via dedicated signalling (e.g. on the Physical Downlink Control Channel, PDCCH).

One set of embodiments explained below sets out how the UE 16 selects the information for or pertaining to one specific serving cell to use for determining the action to perform in respect of the second radio access network.

A second set of embodiments describes how the UE 16 operates to determine the action to perform in respect of the second radio access network when the UE 16 does not have an active connection to the first radio access network and is camped on a cell and only listening for relevant broadcasts from the network. In LTE, a UE 16 operating without an active connection is referred to as operating in an IDLE mode.

A third set of embodiments describes how the UE 16 uses the information for, or pertaining to, multiple cells.

Although the embodiments below are described mainly with reference to the UE 16 obtaining the information and/or configurations from the network and determining the action to take with respect to the second radio access network, it will be appreciated that, unless otherwise expressly indicated, the embodiments can be applied in an analogous manner to the implementations where the network node considers the information and/or configurations and determines the action for the UE 16 to take in respect of the second radio access network.

In the embodiments described below 'load' and thresholds have been used as exemplary parameters to use in the network selection and/or traffic steering process, but it should be appreciated that other types of parameters can be used, for example a parameter called "Resource Allocation Maximum" which corresponds to the amount of resources a UE may receive in UMTS/LTE.

Figure 8:
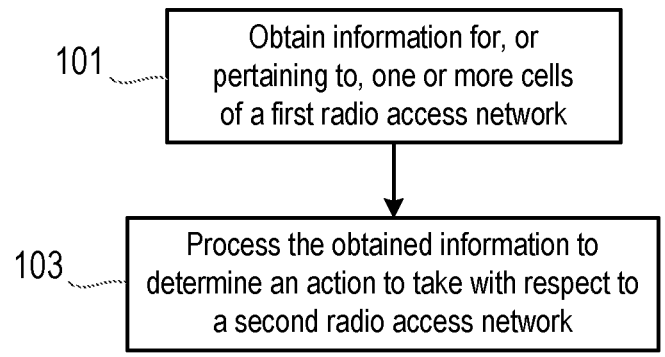
FIG. 8 is a flow chart illustrating a method of operating a mobile device or a network node according to some embodiments.

FIG. 8 is a process flow diagram illustrating a method for handling the connection of a mobile device 16 to two communication networks that use different radio access technologies, with the first of these networks providing for carrier aggregation (e.g. LTE). The method in FIG. 8 is preferably performed by the mobile device 16, although as noted above it can be performed by a node in the network.

In a first step, step 101, the method begins with obtaining information for, or pertaining to, one or more cells in the first radio access network. In some implementations, step 101 comprises the mobile device 16 measuring a signal quality parameter, such as a reference signal received power (RSRP) or similar from signals received for, or pertaining to, one or more cells in the first radio access network. For example the mobile device 16 may measure a signal quality parameter from signals on (and in some cases only on) the primary carrier (PCell) for the mobile device 16. In some cases, step 101 may also or alternatively comprise the mobile device 16 receiving thresholds and/or conditions for, or pertaining to, the one or more cells in the first radio access network that the mobile device 16 uses in the access network selection and/or traffic steering algorithm. In these embodiments, the conditions can comprise one or more rules that are specified by the network for the mobile device to evaluate, and/or the condition of a cell, for example measured in terms of load. In other embodiments, the information obtained by the mobile device 16 in step 101 can comprise the mobile device 16 receiving an explicit indication of the action to take with respect to the second radio access network.

Then, in step 103, the obtained information is processed to determine an action for the mobile device 16 to take with respect to the second radio access network.

Step 103 can comprise determining whether to take any one or more of the following actions with respect to the second radio access network:
- establishing or refraining from establishing a connection to the second radio access network (and disconnecting the connection/maintaining the connection to the first radio access network);
- connecting to or disconnecting from the second radio access network;
- sending or refraining from sending measurement reports regarding the second radio access network to the first radio access network;
- steering traffic or refraining from the steering of traffic to the second radio access network;
- moving some or all traffic from the second radio access network to the first radio access network;
- turning on or refraining from turning on the transceiver module 32, 33 in the mobile device 16 for the radio access technology of the type supported by the second radio access network;
- turning on or turning off the transceiver module 32, 33 in the mobile device 16 for the radio access technology of the type supported by the second radio access network; and
- switching the transceiver module 32, 33 in the mobile device 16 for the radio access technology of the type supported by the second radio access network into or out of a power saving state or mode.

Thus, in some embodiments, step 103 may comprise, for example, only determining whether to connect or disconnect from the second radio access network, whereas in other embodiments, step 103 can comprise which of a number of the listed actions should be performed by the mobile device 16.

In some embodiments, the processing in step 103 can take into account the state of the mobile device 16 with respect to the second radio access network (e.g. connected, disconnected, etc.), such that different states can result in different actions, given the information from the one or more cells of the first radio access network. For instance, in some embodiments carrying out the one or more actions may comprise, in response to particular information, disconnecting from the second radio access network if connected to the second radio access network and otherwise refraining from connecting to the second radio access network.

In some embodiments, the method further comprises a step of performing the determined action.

Where the information obtained by the mobile device 16 in step 101 is an indication of the action the mobile device 16 is to take with respect to the second radio access network, a base station 10, 12, 14 associated with one of the cells or another network node can execute a similar method to that shown in FIG. 8 to determine the action for the mobile device 16 to take with respect to the second radio access network and then transmit an indication of the determined action to the mobile device 16 so that the mobile device 16 can perform the determined action. This indication can be transmitted in the signalling in the primary cell or a secondary cell.

Figure 9:
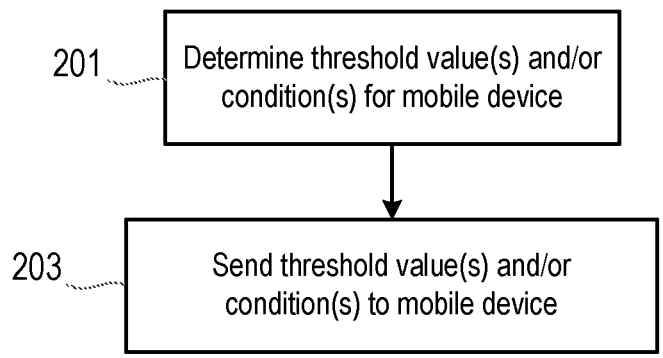
FIG. 9 is a flow chart illustrating a method of operating a network node according to other embodiments.

In embodiments where the mobile device 16 receives thresholds and/or conditions for, or pertaining to, one or more cells in the first radio access network, a base station 10, 12, 14 associated with the one or more cells or another network node can perform a method as shown in FIG. 9. The illustrated method begins in step 201 with determining, for a mobile device 16, one or more threshold values and/or conditions for use in determining how the mobile device 16 should handle connections to a second radio access network. Step 201 can comprise determining the threshold values and/or conditions from information for or pertaining to one or more carriers, or potential carriers for the mobile device 16. The one or more threshold values and/or conditions are then sent to the mobile device 16, as shown in step 203. These threshold values and/or conditions can be sent in a message field that is otherwise used to carry threshold values for regulating the behaviour of the mobile device 16. In some embodiments, the threshold values and/or conditions can be sent to the mobile device 16 over the primary carrier (PCell) for the mobile device 16. In other embodiments, for example where there are different sets of threshold values and/or conditions for different carriers, step 203 can comprise sending each set to the mobile device 16 over the respective carrier (or over control signalling for the respective carrier).

CA Active—Single Configuration

As indicated above, some embodiments provide that a mobile device 16 that is aggregating multiple carriers/cells (and thus has multiple serving cells) obtains and uses the information from just one of the cells in the first radio access network in step 101. These embodiments are referred to as 'CA active—single configuration' since the UE 16 is making use of the information/configuration from a single one of the carriers.

In these embodiments, the UE 16 acts according to a configuration signalled on, or pertaining to, one of the configured serving cells of the UE 16. The UE 16 thus ignores the configurations signalled on, or pertaining to, other serving cells (although the UE 16 may still receive them). The UE 16 may even refrain from receiving the configurations on, or pertaining to, the other serving cells, or refrain from receiving the part of the configuration which the UE 16 will ignore. The benefit of this embodiment is that there will not be any conflicts with regards to which of multiple configurations the UE 16 should act on as the UE 16 only acts according to one configuration.

The UE 16 can determine which cell to use in different ways.

In one example, the first radio access network can indicate to the UE 16 the identity of the cell that the UE 16 should use (which is determined and transmitted to the UE 16 in steps 201 and 203 above). This indication may be a cell indication, e.g. a cell index. The benefit of this implementation is that the network can dynamically change the cell the UE 16 acts according to.

In another example, which is rule based, the UE 16 selects the cell, and thus which configuration the UE 16 should act according to, based on a rule. Some exemplary rules include: (i) the primary cell (PCell), (ii) the cell with the highest/lowest cell index, (iii) the cell with the largest bandwidth, etc. The benefit of this alternative is that if the network is aware of the rule, the network will know which cell's configuration the UE 16 will act according to without requiring any additional signalling between the network and the UE 16. In some implementations, the information obtained by the UE 16 in step 101 can comprise an indication of the rule the UE 16 is to use.

In another example, the UE 16 selects which cell the UE 16 will act according to. In this case, the UE 16 may indicate to the network which cell the UE 16 has selected.

UE in IDLE Mode

As noted above, a second set of embodiments describe how the UE 16 operates to determine the action to perform in respect of the second radio access network when the UE 16 does not have an active connection to the first radio access network, but is camped on a cell and listening for relevant broadcasts from the network. In LTE, a UE 16 operating without an active connection is referred to as operating in an IDLE mode. Other types of radio access networks have similar modes for their UEs 16.

In one embodiment a UE 16 that is in radio resource control (RRC) IDLE mode in LTE (described in 3GPP TS36.304 v11.4.0) acts according to the configuration which is signalled on the cell that the UE 16 is currently "camping" on. Camping here means the UE 16 has selected a specific cell in a cell reselection procedure using cell reselection thresholds and/or policies.

For example, if a UE 16 that is currently in RRC IDLE and is not attached to a WLAN network has to start data transmissions, it may first need to perform a selection procedure where either the 3GPP network or the WLAN is selected to perform the transmission on. One desired behaviour for the UE 16 could be for the UE 16 to connect to the network which currently has the lowest load to provide a better user experience. To extract the load of the 3GPP network the UE 16 would, according to this embodiment, consider the configuration signalled on the cell which the UE 16 is camping on.

In another example, a UE 16 which is connected to the WLAN and in RRC IDLE in the 3GPP network can receive the configuration signalled in the cell that the UE 16 is camping on, and use that configuration to determine whether to perform access selection back from the WLAN to the 3GPP network.

In an alternative embodiment, a UE 16 that is in RRC IDLE in LTE can use the configuration from, or pertaining to, a cell that the UE 16 is currently not camping on. A suitable cell that could be used by the UE 16 in this alternative embodiment can be a cell that the UE 16 has previously had an active connection with (including the multiple cells used in a carrier aggregated configuration) or a neighbouring cell to the cell the UE 16 is currently camped on.

Multiple Configurations

As noted above, a third set of embodiments, referred to as 'Multiple configurations', describes how a UE 16 can use the information/configurations from, or pertaining to, multiple cells. These embodiments can be used when the UE 16 has carrier aggregation active and has multiple serving cells, but they can also or alternatively be used when the UE 16 has a single active carrier, or when the UE 16 is in an inactive, e.g. IDLE, mode and is camping on a cell.

The embodiments below illustrate exemplary ways in which the configurations can be combined.

The UE 16 may be configured such that its configured serving cells, or a subset thereof, are considered when combining the configurations and/or parameters for the cell(s). For example, if the UE 16 is configured with three carriers, denoted serving cell A, B and C, the UE 16 could combine the parameter values/configurations of only two of the serving cells, e.g. A and C.

In an alternative implementation, the set of cells which are considered when combining the configurations and/or parameters by the UE 16 may comprise one or more cells other than the configured serving cells for the UE 16. For example, a UE may be configured with two serving cells, denoted A and B, but the UE 16 may also consider the configuration of a cell C when combining configurations and/or parameter values.

How many and which cells the UE 16 is to consider may be based on a predefined rule (predefined in the UE 16 or indicated to the UE 16 by the network), be determined by the UE 16, be controlled by the network by means of signalling, or a combination thereof.

How many and which cells the UE 16 is to consider may take into account the capability of the UE, for example whether/how many/which frequencies and/or cells the UE can concurrently handle (e.g., detect/monitor/consider).

Which cells are currently considered may depend on whether the cells are activated or deactivated (as described in the MAC specification 3GPP TS 36.321 v11.3.0), and the UE 16 may only consider configurations and/or parameter values for the cells which are activated. The network might not perform signalling of the configurations and/or parameters for all serving cells, for example the network may only perform signalling of the configurations and/or parameters for the cells considered by the UE when combining.

As an example, consider a UE 16 that is configured to combine multiple configurations when operating in IDLE mode. If the cell the UE 16 is camping on (denoted Cell X) is 80% loaded but the UE 16 also hears the signals broadcast in another cell, Cell Y, which is 10% loaded, the UE 16 may be configured to assume that if the UE 16 connects to Cell X it could be handed over to Cell Y (e.g. due to load balancing) and the UE 16 could therefore consider both the broadcasted configuration for Cell X and Cell Y so as to estimate some "overall" available resources. It will be appreciated that there could be some threshold(s)/condition(s) for which 'non-camped-on' cells the UE should consider (e.g. only consider cells from which the received signal level and/or quality exceeds certain thresholds).

Combined Load—

Where the UE 16 measures or receives information on a certain parameter in or for each of multiple cells, the information can be combined in a number of different ways.

In one embodiment the UE 16 calculates an average value over all of the considered cells for the certain parameter. One example parameter is the load, and the UE 16 may calculate an average load value based on the load values of the considered cells. For example, if a UE 16 is configured with three serving cells A, B and C and the load is 30, 70 and 40 percent in the three serving cells respectively, the UE 16 would calculate the average, i.e. approximately 47 percent combined load, using the assumption that the three cells have the same capacity.

In another embodiment the UE 16 can calculate a weighted average of the load in the serving cells where the load is weighted with the potential capacity of the serving cell. A potential capacity metric can be, for example, bandwidth, e.g. if serving cell A has a bandwidth of 10 MHz and load 60% and serving cell B has a bandwidth of 20 MHz and load 90% then the weighted average would be ((10*0.6)+(20*0.9))/(10+20)=80% combined load. It will be appreciated that capacity may also depend on many other parameters which could be considered in the calculation of load such as available features (e.g. if multiple input multiple output (MIMO) is used in communication between the UE 16 and the network on the different cells), etc.

In another embodiment the UE 16 can calculate the weighted average of the free available capacity. For the example above, this value can be 10*(1−0.6)+20*(1−0.9)=6 MHz. So, if there was a WLAN operating at 10 MHz and load value of 50% (weighted free capacity of 10*0.5=5 MHz), the UE 16 might still choose the 3GPP network even though the weighted load of the 3GPP network was 80% and higher than the WLAN load).

In another embodiment, different weight values are associated with the different carriers. For example, a weight value of 1 can be used on the primary carrier and a value less than 1 can be used on the secondary carriers. In carrier aggregation, the cell that is the PCell and the cells that are the SCells are UE-specific, which means that a UE A can be using Cell A as the PCell and Cell B as a SCell, while a UE B can be using Cell B as the PCell and Cell A as a SCell. As described above, the UE's PCell may be considered "more important", for example since control signalling is carried on the PCell, so it can then be expected that a UE 16 which uses a Cell A as the PCell will be given higher priority on this cell compared to a UE 16 which uses the Cell A as an SCell. This alternative embodiment is therefore beneficial as it allows, e.g. a higher weight to be given to the UE's PCell compared to the UE's SCell(s). The weights in this embodiment may be signalled from the network according to the method in FIG. 9 or may be preconfigured in the UE, e.g. by a given rule.

In another embodiment, the combined load parameter (e.g. using the weighted average calculations described above) is computed by the network and communicated to the UE via dedicated signalling. In making this calculation, a network node, such as an eNB 10, 12, 14, can use not only the carriers that are already configured by the UE 16, but also those that could potentially be configured if the need arises. For example, an eNB may have three carriers, but a UE A is only currently configured to use two of these carriers. The eNB 10, 12, 14 may, when it calculates the combined load, consider not only the carriers which the UE A is currently configured to use, but also a carrier which the UE is not currently configured to use. Apart from this, the network can also consider the traffic activity level of the concerned UE 16 to scale the load parameter up or down (e.g. scale the combined load parameter up if the UE is generating a lot of traffic, in order to facilitate the offloading of the UE towards the WLAN and balance the load in the 3GPP network). The network node 10, 12, 14 may also consider cells in other network nodes and specifically the load of those cells. For example, an eNB may consider the load of a neighbouring eNB to which the UE could potentially be handed over.

The combined load (or the load derived using the embodiments in the single configuration or IDLE sections above) can be used by the UE 16 as an input parameter to the access network selection mechanism for selecting whether to use the 3GPP network or the WLAN. One simple selection mechanism could be for the UE 16 to connect to the network, i.e. 3GPP or WLAN, which has the lowest load, or highest available capacity, etc. More advanced selection mechanisms are also possible, for example that the UE 16 will, aside from load, also consider the signal strength in the WLAN and 3GPP network when doing the selection. As noted above, the HotSpot 2.0 mechanism is one possible way for the UE 16 to know the load of the WLAN.

It will be appreciated that the same principles described above can be used to combine parameters other than the load, such as the Resource Allocation Maximum parameter.

Combined Threshold Parameters—

Where the UE 16 receives threshold values from multiple cells in step 101, the multiple thresholds can be combined in a number of different ways.

Just as in the case of the load, the threshold parameters (e.g. RSRP and RSSI thresholds, although other parameters can be measured by the UE 16) signalled in, or pertaining to, each carrier could be different. For example, carrier A may have access selection thresholds of RSSI_threshold_A and RSRP_threshold_A while carrier B may have associated thresholds of RSSI_threshold_B and RSRP_threshold_B. Thus a UE 16 supporting only a single carrier and using carrier A will offload its traffic to the WLAN if RSRP_3GPP<RSRP_threshold_A, and
RSSI_WLAN>RSSI_threshold_A where RSRP_3GPP is the RSRP for signals from the 3GPP network and RSSI_WLAN is the RSSI for signals from the WLAN.

Similarly, a UE 16 supporting only a single carrier and using carrier B will offload its traffic to the WLAN if RSRP_3GPP<RSRP_threshold_B, and
RSSI_WLAN>RSSI_threshold_B However, if a UE 16 supports carrier aggregation, and is using (or is capable of using) both carriers A and B, there can be several ways on how the UE 16 can make use of these threshold values.

In a first specific embodiment, the UE 16 performs offloading if the conditions from/related to all considered carriers are fulfilled. For the example above, the UE 16 offloads its traffic to the WLAN if RSRP_3GPP_carrier_A<RSRP_threshold_A, and
RSSI_WLAN>RSSI_threshold_A, and
RSRP_3GPP_carrier_B<RSRP_threshold_B, and
RSSI_WLAN>RSSI_threshold_B where RSRP_3GPP_carrier_A is the RSRP for carrier A in the 3GPP network, RSRP 3GPP_carrier_B is the RSRP for carrier B in the 3GPP network.

In a second specific embodiment, the UE 16 performs offloading if the conditions from/related to at least one of the considered carriers is fulfilled. For the example above, the UE 16 can offload its traffic to the WLAN if (RSRP_3GPP_carrier_A<RSRP_threshold_A, and
RSSI_WLAN>RSSI_threshold_A) OR
(RSRP_3GPP_carrier_B<RSRP_threshold_B, and
RSSI_WLAN>RSSI_threshold_B).

In a third specific embodiment, the UE 16 can calculate a combined threshold based on thresholds for the same parameter from/related to multiple carriers. For example, a combined RSRP threshold (referred to here as RSRP_threshold_combined) can be defined as a function of RSRP_threshold_A and RSRP_threshold_B. Exemplary functions include the maximum, minimum, average, etc. of the considered threshold values and can even consider other aspects like the bandwidth of the different carriers, the type of carriers (e.g. PCell/SCell), etc.

As noted above, which cells the UE 16 is to consider may be based on a predefined rule, be determined by the UE, be controlled by the network by means of signalling, or a combination thereof.

It will be appreciated that similar embodiments to those specific embodiments described above can be used when the UE 16 receives threshold information from three or more cells in the 3GPP network.

Combinations of the above specific embodiments are also possible. For example a combination of the first and third specific embodiments could be as follows. The UE 16 receives from carrier A, B and C the RSRP thresholds RSRP_threshold_A, RSRP_threshold_B and RSRP_threshold_C respectively, as well as RSSI_threshold_A, RSSI_threshold_B and RSSI_threshold_C respectively. The UE 16 can calculate a combined RSSI threshold RSSI_threshold_combined, e.g. by setting RSSI_threshold_combined to the maximum value of the RSSI_threshold_A, RSSI_threshold_B and RSSI_threshold_C. The UE 16 would, in this example combination, however not combine the RSRP thresholds. The UE would, according to the first specific embodiment, offload to the WLAN if
  RSRP_3GPP_carrier_A<RSRP_threshold_A, and
  RSRP_3GPP_carrier_B<RSRP_threshold_B, and
  RSRP_3GPP_carrier_C<RSRP_threshold_C, and
  RSSI_WLAN>RSSI_threshold_combined A combination of the second and third specific embodiments could be as follows. The UE 16 receives from carrier A, B and C the RSRP thresholds RSRP_threshold_A, RSRP_threshold_B and RSRP_threshold_C respectively, as well as RSSI_threshold_A, RSSI_threshold_B and RSSI_threshold_C respectively. The UE 16 calculates a combined RSRP threshold RSRP_threshold_combined, e.g. by setting RSSI_threshold_combined to the minimum value of the RSRP_threshold_A, RSRP_threshold_B and RSRP_threshold_C. The UE 16 also calculates a combined RSSI threshold (RSSI_threshold_combined) by calculating the average of RSSI_threshold_A, RSSI_threshold_B and RSSI_threshold_C. The UE 16 would, according to the second specific embodiment, offload to WLAN if
  (RSRP_3GPP_carrier_A<RSRP_threshold_combined, or
  RSRP_3GPP_carrier_B<RSRP_threshold_combined, or
  RSRP_3GPP_carrier_C<RSRP_threshold_combined),
  AND
  RSSI_WLAN>RSSI_threshold_combined.

It will be appreciated that although the above examples only consider the conditions that have to be satisfied in order for the UE 16 to offload its traffic to the WLAN, similar principles of threshold combination can be applied to the transfer of the traffic back from the WLAN to the 3GPP network, or for any of the other actions described with reference to step 103 above.

It will be appreciated by those skilled in the art that RSRP and RSSI are exemplary parameters that can be measured in the 3GPP network and WLAN respectively, and that other types of parameters and thresholds can be used in the access selection procedure.

Furthermore, it will be appreciated by those skilled in the art that the use of the embodiments described herein for the selection of an access network includes the selection of an access network for the purposes of traffic steering.

There is therefore provided techniques for enabling proper or more appropriate selection of an access network and/or traffic steering when a CA-capable mobile device 16 is able to obtain information/thresholds/conditions/configurations from multiple carriers.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Embodiments of the techniques and apparatus described above include but are not limited to:

1. A method, in a mobile device, for handling connections to a first radio access network that uses a first radio access technology and a second radio access network that uses a second, different, radio access technology, the mobile device being capable of aggregating a plurality of carriers in the first radio access network, the method comprising:
  obtaining information for, or pertaining to, one or more carriers in the first radio access network;
  processing the obtained information to determine an action for the mobile device to take with respect to the second radio access network.

2. A method of 1, wherein the method further comprises the step of:
  performing the determined action with respect to the second radio access network.

3. The method of 1 or 2, wherein the step of processing comprises determining whether to take one or more of the following actions:
  establishing or refraining from establishing a connection to the second radio access network;
  connecting to or disconnecting from the second radio access network;
  sending or refraining from sending measurement reports regarding the second radio access network to the first radio access network;
  steering traffic or refraining from the steering of traffic to the second radio access network;
  moving some or all of traffic from the second radio access network to the first radio access network;
  turning on or refraining from turning on a transceiver module for the second radio access technology in the mobile device;
  turning on or turning off a transceiver module for the second radio access technology in the mobile device;
  switching a transceiver module for the second radio access technology in the mobile device into or out of a power saving state or mode.

4. The method of any of 1-3, wherein the one or more actions carried out are further based on a state of the mobile terminal with respect to the second radio access network, such that different states can result in different actions, given the same threshold values and/or conditions.

5. The method of any of 1-4, wherein the first radio access network is a cellular telecommunications network and the second radio access network is a cellular telecommunications network or a wireless local area network.

6. The method of 5, wherein the first radio access network is a 3GPP-standardized network.

7. The method of 6, wherein the 3GPP-standardized network is an LTE network or a UMTS network.

8. The method of 5 or 6, wherein the second radio access network is a WiMAX, GSM network or an IEEE 802.11 wireless local area network.

9. The method of any of 1-8, wherein the step of obtaining information for, or pertaining to, one or more carriers in the first radio access network comprises any one or more of:
measuring a signal quality parameter for signals on one or more of the one or more carriers;
reading one or more threshold value(s) and/or condition(s) for, or pertaining to, one or more of the one or more carriers;
receiving an indication of the load in one or more of the one or more carriers; and
receiving an indication of the action for the mobile device to take with respect to the second radio access network.

10. The method of any of 1-9, wherein, when the mobile device is aggregating a plurality of carriers, the step of obtaining information for, or pertaining to, one or more carriers in the first radio access network comprises obtaining and/or considering the information for, or pertaining to, just one carrier.

11. The method of 10, wherein the information is obtained for, or pertaining to, just one of the plurality of aggregated carriers.

12. The method of 11, wherein the mobile device determines which one of the plurality of aggregated carriers to obtain information for, or pertaining to, using a rule.

13. The method of 12, wherein the rule comprises any one of:
use a primary carrier of the plurality of aggregated carriers;
use the carrier with the highest or lowest cell index; and
use the carrier with the largest bandwidth.

14. The method of any of 1-9, wherein, when the mobile device is aggregating a plurality of carriers, the method further comprises the step of receiving an indication of the identity of a carrier and the step of obtaining information for, or pertaining to, one or more carriers in the first radio access network comprises obtaining information from the identified carrier.

15. The method of any of 1-9, wherein, when the mobile device is camped on a carrier and in an idle mode, the step of obtaining information for, or pertaining to, one or more carriers in the first radio access network comprises obtaining information for, or pertaining to, the carrier the mobile device is camped on.

16. The method of any of 1-9, wherein, when the mobile device is camped on a carrier and in an idle mode, the step of obtaining information for, or pertaining to, one or more carriers in the first radio access network comprises obtaining information for, or pertaining to, a carrier that the mobile device is not currently camped on.

17. The method of 16, wherein the carrier the mobile device is not currently camped on is a carrier the mobile device has previously been connected to or a neighbouring carrier of the carrier the mobile device is currently camped on.

18. The method of any of 1-9, wherein the step of obtaining information comprises obtaining information for, or pertaining to, two or more carriers in the first radio access network.

19. The method of 18, wherein the step of obtaining information for, or pertaining to, two or more carriers in the first radio access network is performed when the mobile device is camped on a carrier and in an idle mode, when the mobile device is connected to a single carrier or when the mobile device is aggregating a plurality of carriers.

20. The method of 19, wherein, when the mobile device is aggregating a plurality of carriers, the step of obtaining information comprises obtaining information for, or pertaining to, each of or a subset of the plurality of aggregated carriers.

21. The method of 18, 19 or 20, wherein the obtained information comprises a parameter for each of the two or more carriers, and the step of processing the obtained information further comprises averaging the obtained parameters for each of the two or more carriers and using averaged parameter to determine the action for the mobile device to take with respect to the second radio access network.

22. The method of 18, 19 or 20, wherein the obtained information comprises a parameter for each of the two or more carriers, and the step of processing the obtained information further comprises calculating a weighted average of the obtained parameters for each of the two or more carriers and using the weighted average to determine the action for the mobile device to take with respect to the second radio access network.

23. The method of 22, wherein the step of calculating the weighted average comprises weighting each parameter according to the bandwidth of the respective carrier, the available capacity of the respective carrier, or whether the respective carrier is a primary carrier or a secondary carrier for the mobile device.

24. The method of 21, 22 or 23, wherein the parameter is load.

25. The method of 18-20, wherein the obtained information comprises one or more threshold values for each of the two or more carriers, and the step of processing the obtained information comprises evaluating if all threshold values for all of the two or more carriers are fulfilled.

26. The method of 18-20, wherein the obtained information comprises one or more threshold values for each of the two or more carriers, and the step of processing the obtained information comprises evaluating if all threshold values for at least one of the carriers are fulfilled.

27. The method of 18-20, wherein the obtained information comprises one or more threshold values for each of the two or more carriers, and the step of processing the obtained information comprises calculating a combined threshold value.

28. The method of 27, wherein the step of calculating a combined threshold value comprises selecting a maximum one of the obtained threshold values, a minimum one of the obtained threshold values or an average one of the obtained threshold values.

29. A mobile device configured to selectively connect to a first radio access network that uses a first radio access technology and a second radio access network that uses a second, different, radio access technology, the mobile device being configured to selectively aggregate a plurality of carriers in the first radio access network, the mobile device comprising:
a processing module configured to obtain information for, or pertaining to, one or more carriers in the first radio access network and to process the obtained information to determine an action for the mobile device to take with respect to the second radio access network.

Further embodiments of the mobile device are contemplated corresponding to the above method embodiments.

30. A method, in a network node of a first radio access network that uses a first radio access technology, for enabling a mobile device to selectively connect to the first radio access network and a second radio access network that uses a second, different, radio access technology, the mobile device being capable of aggregating a plurality of carriers in the first radio access network, the method comprising:
   determining, for the mobile device, one or more threshold values and/or conditions for use in determining how the mobile device should handle connections to the second radio access network; and
   sending the one or more threshold values and/or conditions to the mobile device.

31. A method, in a network node of a first radio access network that uses a first radio access technology, for enabling a mobile device to selectively connect to the first radio access network and a second radio access network that uses a second, different, radio access technology, the mobile device being capable of aggregating a plurality of carriers in the first radio access network, the method comprising:
   obtaining information for, or pertaining to, one or more carriers in the first radio access network;
   processing the obtained information to determine an action for the mobile device to take with respect to the second radio access network.

32. The method of 31, further comprising the step of:
   transmitting an indication of the determined action to the mobile device.

33. The method of any of 30-32, wherein the first radio access network is a cellular telecommunications network and the second radio access network is a cellular telecommunications network or a wireless local area network.

34. The method of 33, wherein the first radio access network is a 3GPP-standardized network.

35. The method of 34, wherein the 3GPP-standardized network is an LTE network or a UMTS network.

36. The method of 34 or 35, wherein the second radio access network is a WiMAX, GSM network or an IEEE 802.11 wireless local area network.

37. The method of any of 30-36, wherein the network node is a base station.

Further embodiments of the method in the network node similar to the methods performed in the mobile device above are contemplated.

38. A network node for use in a first radio access network that uses a first radio access technology, for enabling a mobile device to selectively connect to the first radio access network and a second radio access network that uses a second, different, radio access technology, the mobile device being capable of aggregating a plurality of carriers in the first radio access network, the network node comprising:
   a processing module configured to determine, for the mobile device, one or more threshold values and/or conditions for use in determining how the mobile device should handle connections to the second radio access network; and
   a transceiver module configured to transmit the one or more threshold values and/or conditions to the mobile device.

39. A network node for use in a first radio access network that uses a first radio access technology, for enabling a mobile device to selectively connect to the first radio access network and a second radio access network that uses a second, different, radio access technology, the mobile device being capable of aggregating a plurality of carriers in the first radio access network, the network node comprising:
   a processing module configured to obtain information for, or pertaining to, one or more carriers in the first radio access network and to process the obtained information to determine an action for the mobile device to take with respect to the second radio access network.

Further embodiments of the network node are contemplated corresponding to the above method embodiments.

40. A method of operating a mobile device that is configured for use in a first radio access network that uses a first radio access technology and a second radio access network that uses a second, different, radio access technology, the mobile device being capable of aggregating a plurality of carriers in the first radio access network, the method comprising:
   obtaining information for, or pertaining to, two or more carriers in the first radio access network (101); and
   processing the obtained information to determine an action for the mobile device to take with respect to the second radio access network (103).

41. The method of 40, wherein the step of obtaining information for, or pertaining to, two or more carriers in the first radio access network (101) is performed when the mobile device is camped on a carrier and in an idle mode, when the mobile device is connected to a single carrier or when the mobile device is aggregating a plurality of carriers.

42. The method of either of 40 or 41, wherein, when the mobile device is aggregating a plurality of carriers, the step of obtaining information (101) comprises obtaining information for, or pertaining to, each of or a subset of the plurality of aggregated carriers.

43. The method of any of 40-42, wherein the obtained information comprises a parameter for each of the two or more carriers, and the step of processing the obtained information (103) further comprises averaging the obtained parameters for each of the two or more carriers and using the averaged parameter to determine the action for the mobile device to take with respect to the second radio access network.

44. The method of any of 40-42, wherein the obtained information comprises a parameter for each of the two or more carriers, and the step of processing the obtained information (103) further comprises calculating a weighted average of the obtained parameters for each of the two or more carriers and using the weighted average to determine the action for the mobile device to take with respect to the second radio access network.

45. The method of 44, wherein the step of calculating the weighted average comprises weighting each parameter according to the bandwidth of the respective carrier, the available capacity of the respective carrier, or whether the respective carrier is a primary carrier or a secondary carrier for the mobile device.

46. The method of any of 43, 44 or 45, wherein the parameter is load.

47. The method of any of 40-42, wherein the obtained information comprises one or more threshold values for each of the two or more carriers, and the step of processing the obtained information (103) comprises evaluating if all threshold values for all of the two or more carriers are fulfilled.

48. The method of any of 40-42, wherein the obtained information comprises one or more threshold values for each of the two or more carriers, and the step of processing the obtained information (103) comprises evaluating if all threshold values for at least one of the carriers are fulfilled.

49. The method of any of 40-42, wherein the obtained information comprises one or more threshold values for each of the two or more carriers, and the step of processing the obtained information (103) comprises calculating a combined threshold value.

50. The method of 49, wherein the step of calculating a combined threshold value comprises selecting a maximum one of the obtained threshold values, a minimum one of the obtained threshold values or an average one of the obtained threshold values.

51. The method of any of 40 or 41, wherein, when the mobile device is camped on a carrier and in an idle mode, the step of obtaining information for, or pertaining to, two or more carriers in the first radio access network (101) comprises obtaining information for, or pertaining to, the carrier the mobile device is camped on.

52. The method of any of 40, 41 and 51, wherein, when the mobile device is camped on a carrier and in an idle mode, the step of obtaining information for, or pertaining to, two or more carriers in the first radio access network (101) comprises obtaining information for, or pertaining to, a carrier that the mobile device is not currently camped on.

53. The method of 52, wherein the carrier the mobile device is not currently camped on is a carrier the mobile device has previously been connected to or a neighbouring carrier of the carrier the mobile device is currently camped on.

54. A method of any of 40-53, wherein the method further comprises the step of: performing the determined action with respect to the second radio access network.

55. The method of any of 40-54, wherein the step of processing comprises determining whether to take one or more of the following actions:
  establishing or refraining from establishing a connection to the second radio access network;
  connecting to or disconnecting from the second radio access network;
  sending or refraining from sending measurement reports regarding the second radio access network to the first radio access network;
  steering traffic or refraining from the steering of traffic to the second radio access network;
  moving some or all of traffic from the second radio access network to the first radio access network;
  turning on or refraining from turning on a transceiver module for the second radio access technology in the mobile device;
  turning on or turning off a transceiver module for the second radio access technology in the mobile device;
  switching a transceiver module for the second radio access technology in the mobile device into or out of a power saving state or mode.

56. The method of any of 40-55, wherein the one or more actions carried out are further based on a state of the mobile terminal with respect to the second radio access network, such that different states can result in different actions, given the same threshold values and/or conditions.

57. The method of any of 40-56, wherein the step of obtaining information for, or pertaining to, one or more carriers in the first radio access network (101) comprises any one or more of:
  measuring a signal quality parameter for signals on one or more of the one or more carriers;
  reading one or more threshold value(s) and/or condition(s) for, or pertaining to, one or more of the one or more carriers;
  receiving an indication of the load in one or more of the one or more carriers; and
  receiving an indication of the action for the mobile device to take with respect to the second radio access network.

58. A mobile device (16) for use in a first radio access network (2) that uses a first radio access technology and a second radio access network (20) that uses a second, different, radio access technology, the mobile device being configured to selectively aggregate a plurality of carriers in the first radio access network, the mobile device comprising:
  a processing module (30) configured to obtain information for, or pertaining to, two or more carriers in the first radio access network and to process the obtained information to determine an action for the mobile device to take with respect to the second radio access network.

59. The mobile device (16) of 58, wherein the processing module (30) is configured to obtain the information for, or pertaining to, two or more carriers in the first radio access network (2) when the mobile device is camped on a carrier and in an idle mode, when the mobile device is connected to a single carrier or when the mobile device is aggregating a plurality of carriers.

60. The mobile device (16) of either of 58 or 59, wherein the processing module (30) is configured to obtain information for, or pertaining to, each of or a subset of the plurality of aggregated carriers when the mobile device is aggregating a plurality of carriers.

61. The mobile device (16) of any of 58-60, wherein the obtained information comprises a parameter for each of the two or more carriers, and the processing module (30) is configured to process the obtained information by averaging the obtained parameters for each of the two or more carriers and using the averaged parameter to determine the action for the mobile device to take with respect to the second radio access network (20).

62. The mobile device (16) of any of 58-60, wherein the obtained information comprises a parameter for each of the two or more carriers, and the processing module (30) is configured to process the obtained information by calculating a weighted average of the obtained parameters for each of the two or more carriers and using the weighted average to determine the action for the mobile device to take with respect to the second radio access network (20).

63. The mobile device (16) of 62, wherein the processing module (30) is configured to calculate the weighted average by weighting each parameter according to the bandwidth of the respective carrier, the available capacity of the respective carrier, or whether the respective carrier is a primary carrier or a secondary carrier for the mobile device.

64. The mobile device (16) of any of 61, 62 or 63, wherein the parameter is load.

65. The mobile device (16) of any of 58-60, wherein the obtained information comprises one or more threshold values for each of the two or more carriers, and the processing module (30) is configured to process the obtained information by evaluating if all threshold values for all of the two or more carriers are fulfilled.

66. The mobile device (16) of any of 58-60, wherein the obtained information comprises one or more threshold values for each of the two or more carriers, and the processing module (30) is configured to process the obtained information by evaluating if all threshold values for at least one of the carriers are fulfilled.

67. The mobile device (16) of any of 58-60, wherein the obtained information comprises one or more threshold values for each of the two or more carriers, and the processing module (30) is configured to process the obtained information by calculating a combined threshold value.

68. The mobile device (16) of 67, wherein the processing module (30) is configured to calculate a combined threshold value by selecting a maximum one of the obtained threshold values, a minimum one of the obtained threshold values or an average one of the obtained threshold values.

69. The mobile device (16) of any of 58 or 59, wherein the processing module (30) is configured to obtain information for, or pertaining to, the carrier the mobile device is camped on when the mobile device is camped on a carrier and in an idle mode.

70. The mobile device (16) of any of 58, 59 or 60, wherein the processing module (30) is configured to obtain information for, or pertaining to, a carrier that the mobile device is not currently camped on when the mobile device is camped on a carrier and in an idle mode.

71. The mobile device (16) of 70, wherein the carrier the mobile device is not currently camped on is a carrier the mobile device has previously been connected to or a neighbouring carrier of the carrier the mobile device is currently camped on.

72. The mobile device (16) of any of 58-71, wherein the processing module (30) is configured to:
perform the determined action with respect to the second radio access network (20).

73. The mobile device (16) of any of 58-72, wherein the processing module (30) is configured to determine whether to take one or more of the following actions:
establishing or refraining from establishing a connection to the second radio access network (20);
connecting to or disconnecting from the second radio access network;
sending or refraining from sending measurement reports regarding the second radio access network to the first radio access network;
steering traffic or refraining from the steering of traffic to the second radio access network;
moving some or all of traffic from the second radio access network to the first radio access network;
turning on or refraining from turning on a transceiver module for the second radio access technology in the mobile device;
turning on or turning off a transceiver module for the second radio access technology in the mobile device;
switching a transceiver module for the second radio access technology in the mobile device into or out of a power saving state or mode.

74. The mobile device (16) of any of 58-73, wherein the one or more actions carried out are further based on a state of the mobile terminal with respect to the second radio access network (20), such that different states can result in different actions, given the same threshold values and/or conditions.

75. The mobile device (16) of any of 58-74, wherein the processing module (30) is configured to obtain information for, or pertaining to, one or more carriers in the first radio access network (2) by any one or more of:
measuring a signal quality parameter for signals on one or more of the one or more carriers;
reading one or more threshold value(s) and/or condition(s) for, or pertaining to, one or more of the one or more carriers;
receiving an indication of the load in one or more of the one or more carriers; and
receiving an indication of the action for the mobile device to take with respect to the second radio access network (20).

76. A method, in a network node of a first radio access network that uses a first radio access technology, for enabling a mobile device to selectively connect to, and/or steer traffic to, the first radio access network and a second radio access network that uses a second, different, radio access technology, the mobile device being capable of aggregating a plurality of carriers in the first radio access network, the method comprising:
determining, for the mobile device, one or more threshold values and/or conditions for the mobile device (201), the one or more threshold values and/or conditions being for use in determining how the mobile device should handle connections to the second radio access network and being determined based on information for, or pertaining to, two or more carriers or cells in the first radio access network; and
sending the one or more threshold values and/or conditions to the mobile device (203).

77. The method of 76, wherein the one or more threshold values and/or conditions for the mobile device are determined based on information for, or pertaining to, each of or a subset of a plurality of carriers aggregated by the mobile device.

78. The method of any of 76 or 77, wherein the information comprises one or more threshold values for each of the two or more carriers or cells, and the step of determining (201) comprises calculating a combined threshold value.

79. The method of 78, wherein the step of calculating a combined threshold value comprises selecting a maximum one of the threshold values, a minimum one of the threshold values or an average one of the threshold values.

80. The method of any of 76-79, wherein, when the mobile device is camped on a carrier and in an idle mode, the information for, or pertaining to, two or more carriers or cells in the first radio access network comprises information for, or pertaining to, the carrier the mobile device is camped on.

81. The method of any of 76-79, wherein, when the mobile device is camped on a carrier and in an idle mode, the information for, or pertaining to, two or more carriers or cells in the first radio access network comprises information for, or pertaining to, a carrier that the mobile device is not currently camped on.

82. The method of 81, wherein the carrier the mobile device is not currently camped on is a carrier the mobile device has previously been connected to or a neighbouring carrier of the carrier the mobile device is currently camped on.

83. The method of any of 76-79, wherein the step of sending the one or more threshold values and/or conditions to the mobile device comprises sending the one or more threshold values and/or conditions over a primary carrier for the mobile device.

84. A network node (18; 10) for use in a first radio access network (2) that uses a first radio access technology for enabling a mobile device (16) to selectively connect to, and/or steer traffic to, the first radio access network and a second radio access network (20) that uses a second, different, radio access technology, the mobile device being capable of aggregating a plurality of carriers in the first radio access network, the network node comprising:
a processing module (60; 40) configured to determine, for the mobile device, one or more threshold values and/or conditions for use in determining how the mobile device should handle connections to the second radio access network the one or more threshold values and/or conditions being determined based on information for, or pertaining to, two or more carriers or cells in the first radio access network; and
a transceiver module (62; 42) configured to transmit the one or more threshold values and/or conditions to the mobile device.

85. The network node (18; 10) of 84, wherein the one or more threshold values and/or conditions for the mobile device (16) are determined based on information for, or pertaining to, each of or a subset of a plurality of carriers aggregated by the mobile device.

86. The network node (18; 10) of any of 84 or 85, wherein the information comprises one or more threshold values for each of the two or more carriers or cells, and the processing module is configured to calculate a combined threshold value.

87. The network node (18; 10) of 86, wherein the processing module (60; 40) is configured to calculate a combined threshold value by selecting a maximum one of the threshold values, a minimum one of the threshold values or an average one of the threshold values.

88. The network node (18; 10) of any of 84-87, wherein, when the mobile device (16) is camped on a carrier and in an idle mode, the information for, or pertaining to, two or more carriers or cells in the first radio access network (2) comprises information for, or pertaining to, the carrier the mobile device is camped on.

89. The network node (18; 10) of any of 84-87, wherein, when the mobile device (16) is camped on a carrier and in an idle mode, the information for, or pertaining to, two or more carriers or cells in the first radio access network (2) comprises information for, or pertaining to, a carrier that the mobile device is not currently camped on.

90. The network node (18; 10) of 89, wherein the carrier the mobile device (16) is not currently camped on is a carrier the mobile device has previously been connected to or a neighbouring carrier of the carrier the mobile device is currently camped on.

91. The network node (18; 10) of any of 84-90, wherein the processing module (60; 40) is configured to send the one or more threshold values and/or conditions to the mobile device (16) over a primary carrier for the mobile device.

92. A method in a network node of a first radio access network that uses a first radio access technology for enabling a mobile device to selectively connect to, and/or steer traffic to, the first radio access network and a second radio access network that uses a second, different, radio access technology, the mobile device being capable of aggregating a plurality of carriers in the first radio access network, the method comprising:
 obtaining information for, or pertaining to, two or more carriers in the first radio access network (101); and
 processing the obtained information to determine an action for the mobile device to take with respect to the second radio access network (103).

93. The method of 92, wherein the step of obtaining information for, or pertaining to, two or more carriers in the first radio access network (101) is performed when the mobile device is camped on a carrier and in an idle mode, when the mobile device is connected to a single carrier or when the mobile device is aggregating a plurality of carriers.

94. The method of either of 92 or 93, wherein, when the mobile device is aggregating a plurality of carriers, the step of obtaining information (101) comprises obtaining information for, or pertaining to, each of or a subset of the plurality of aggregated carriers.

95. The method of any of 92-94, wherein the obtained information comprises a parameter for each of the two or more carriers, and the step of processing the obtained information (103) further comprises averaging the obtained parameters for each of the two or more carriers and using the averaged parameter to determine the action for the mobile device to take with respect to the second radio access network.

96. The method of any of 92-94, wherein the obtained information comprises a parameter for each of the two or more carriers, and the step of processing the obtained information (103) further comprises calculating a weighted average of the obtained parameters for each of the two or more carriers and using the weighted average to determine the action for the mobile device to take with respect to the second radio access network.

97. The method of 96, wherein the step of calculating the weighted average comprises weighting each parameter according to the bandwidth of the respective carrier, the available capacity of the respective carrier, or whether the respective carrier is a primary carrier or a secondary carrier for the mobile device.

98. The method of any of 95, 96 or 97, wherein the parameter is load.

99. The method of any of 92-94, wherein the obtained information comprises one or more threshold values for each of the two or more carriers, and the step of processing the obtained information (103) comprises evaluating if all threshold values for all of the two or more carriers are fulfilled.

100. The method of any of 92-94, wherein the obtained information comprises one or more threshold values for each of the two or more carriers, and the step of processing the obtained information (103) comprises evaluating if all threshold values for at least one of the carriers are fulfilled.

101. The method of any of 92-94, wherein the obtained information comprises one or more threshold values for each of the two or more carriers, and the step of processing the obtained information (103) comprises calculating a combined threshold value.

102. The method of 101, wherein the step of calculating a combined threshold value comprises selecting a maximum one of the obtained threshold values, a minimum one of the obtained threshold values or an average one of the obtained threshold values.

103. The method of any of 93 or 94, wherein, when the mobile device is camped on a carrier and in an idle mode, the step of obtaining information for, or pertaining to, two or more carriers in the first radio access network (101) comprises obtaining information for, or pertaining to, the carrier the mobile device is camped on.

104. The method of any of 92, 93 or 103, wherein, when the mobile device is camped on a carrier and in an idle mode, the step of obtaining information for, or pertaining to, two or more carriers in the first radio access network (101) comprises obtaining information for, or pertaining to, a carrier that the mobile device is not currently camped on.

105. The method of 104, wherein the carrier the mobile device is not currently camped on is a carrier the mobile device has previously been connected to or a neighbouring carrier of the carrier the mobile device is currently camped on.

106. The method of any of 92-105, wherein the step of processing comprises determining whether to take one or more of the following actions:
 establishing or refraining from establishing a connection to the second radio access network;
 connecting to or disconnecting from the second radio access network;
 sending or refraining from sending measurement reports regarding the second radio access network to the first radio access network;

steering traffic or refraining from the steering of traffic to the second radio access network;

moving some or all of traffic from the second radio access network to the first radio access network;

turning on or refraining from turning on a transceiver module for the second radio access technology in the mobile device;

turning on or turning off a transceiver module for the second radio access technology in the mobile device;

switching a transceiver module for the second radio access technology in the mobile device into or out of a power saving state or mode.

107. The method of any of 92-106, wherein the one or more actions carried out are further based on a state of the mobile terminal with respect to the second radio access network, such that different states can result in different actions, given the same threshold values and/or conditions.

108. The method of any of 92-107, further comprising the step of:

transmitting an indication of the determined action to the mobile device.

109. The method of any of 92-108, wherein the first radio access network is a cellular telecommunications network and the second radio access network is a cellular telecommunications network or a wireless local area network.

110. The method of 109, wherein the first radio access network is a 3GPP-standardized network.

111. The method of 110, wherein the 3GPP-standardized network is an LTE network or a UMTS network.

112. The method of 110 or 111, wherein the second radio access network is a WiMAX, GSM network or an IEEE 802.11 wireless local area network.

113. The method of any of 92-112, wherein the network node is a base station or radio network controller, RNC.

114. A network node (18; 10) for use in a first radio access network (2) that uses a first radio access technology, for enabling a mobile device (16) to selectively connect to, and/or steer traffic to, the first radio access network and a second radio access network (20) that uses a second, different, radio access technology, the mobile device being capable of aggregating a plurality of carriers in the first radio access network, the network node comprising:

a processing module (60; 40) configured to obtain information for, or pertaining to, two or more carriers in the first radio access network and to process the obtained information to determine an action for the mobile device to take with respect to the second radio access network.

115. The network node (18; 10) of 114, wherein the processing mode is (60; 40) is configured to obtain information for, or pertaining to, two or more carriers in the first radio access network (2) when the mobile device (16) is camped on a carrier and in an idle mode, when the mobile device is connected to a single carrier or when the mobile device is aggregating a plurality of carriers.

116. The network node (18; 10) of either of 114 or 115, wherein, the processing module (60; 40) is configured to obtain information for, or pertaining to, each of or a subset of the plurality of aggregated carriers when the mobile device (16) is aggregating a plurality of carriers.

117. The network node (18; 10) of any of 114-116, wherein the obtained information comprises a parameter for each of the two or more carriers, and the processing module (60; 40) is configured to process the obtained information by averaging the obtained parameters for each of the two or more carriers and using the averaged parameter to determine the action for the mobile device (16) to take with respect to the second radio access network (20).

118. The network node (18; 10) of any of 114-117, wherein the obtained information comprises a parameter for each of the two or more carriers, and the processing module (60; 40) is configured to process the obtained information by calculating a weighted average of the obtained parameters for each of the two or more carriers and using the weighted average to determine the action for the mobile device (16) to take with respect to the second radio access network (20).

119. The network node (18; 10) of 118, wherein the processing module (60; 40) is configured to calculate the weighted average by weighting each parameter according to the bandwidth of the respective carrier, the available capacity of the respective carrier, or whether the respective carrier is a primary carrier or a secondary carrier for the mobile device (16).

120. The network node (18; 10) of any of 117, 118 or 119, wherein the parameter is load.

121. The network node (18; 10) of any of 114-116, wherein the obtained information comprises one or more threshold values for each of the two or more carriers, and the processing module (60; 40) is configured to process the obtained information to evaluate if all threshold values for all of the two or more carriers are fulfilled.

122. The network node (18; 10) of any of 114-116, wherein the obtained information comprises one or more threshold values for each of the two or more carriers, and the processing module (60; 40) is configured to process the obtained information to evaluate if all threshold values for at least one of the carriers are fulfilled.

123. The network node (18; 10) of any of 114-116, wherein the obtained information comprises one or more threshold values for each of the two or more carriers, and the processing module (60; 40) is configured to process the obtained information to calculate a combined threshold value.

124. The network node (18; 10) of 123, wherein the processing module (60; 40) is configured to calculate a combined threshold value by selecting a maximum one of the obtained threshold values, a minimum one of the obtained threshold values or an average one of the obtained threshold values.

125. The network node (18; 10) of any of 114 or 115, wherein, when the mobile device (16) is camped on a carrier and in an idle mode, the processing module (60; 40) is configured to obtain information for, or pertaining to, the carrier the mobile device is camped on.

126. The network node (18; 10) of any of 114, 115 or 125, wherein, when the mobile device (16) is camped on a carrier and in an idle mode, the processing module (60; 40) is configured to obtain information for, or pertaining to, a carrier that the mobile device is not currently camped on.

127. The network node (18; 10) of 126, wherein the carrier the mobile device (16) is not currently camped on is a carrier the mobile device has previously been connected to or a neighbouring carrier of the carrier the mobile device is currently camped on.

128. The network node (18; 10) of any of 114-127, wherein the processing module (60; 40) is configured to process the obtained information to determine whether to take one or more of the following actions:

establishing or refraining from establishing a connection to the second radio access network (20);

connecting to or disconnecting from the second radio access network;

sending or refraining from sending measurement reports regarding the second radio access network to the first radio access network (2);

steering traffic or refraining from the steering of traffic to the second radio access network;

moving some or all of traffic from the second radio access network to the first radio access network;

turning on or refraining from turning on a transceiver module for the second radio access technology in the mobile device (16);

turning on or turning off a transceiver module for the second radio access technology in the mobile device;

switching a transceiver module for the second radio access technology in the mobile device into or out of a power saving state or mode.

129. The network node (18; 10) of any of 114-128, wherein the one or more actions carried out are further based on a state of the mobile terminal with respect to the second radio access network (20), such that different states can result in different actions, given the same threshold values and/or conditions.

130. The network node (18; 10) of any of 114-129, the network node further comprising a transceiver module (62; 42) for transmitting an indication of the determined action to the mobile device (16).

131. The network node (18; 10) of any of 114-130, wherein the first radio access network (2) is a cellular telecommunications network and the second radio access network (20) is a cellular telecommunications network or a wireless local area network.

132. The network node (18; 10) of 131, wherein the first radio access network (2) is a 3GPP-standardized network.

133. The network node (18; 10) of 132, wherein the 3GPP-standardized network is an LTE network or a UMTS network.

134. The network node (18; 10) of 131 or 132, wherein the second radio access network (20) is a WiMAX, GSM network or an IEEE 802.11 wireless local area network.

135. The network node (18; 10) of any of 114-134, wherein the network node is a base station or radio network controller, RNC.

The invention claimed is:

1. A method in a mobile device that is configured for use in a first radio access network that uses a first radio access technology and a second radio access network that uses a second, different, radio access technology, the mobile device aggregating a plurality of carriers in the first radio access network, the method comprising:

obtaining information for, or pertaining to, each of two or more of the plurality of carriers in the first radio access network, wherein the obtained information for each of the two or more carriers comprises one or more threshold values and/or conditions for use in determining how the mobile device handles connections to the second radio access network; and processing the obtained information for only a single carrier to determine an action for the mobile device to take with respect to the second radio access network, wherein processing the obtained information for only the single carrier comprises using the one or more threshold values and/or conditions corresponding to the single carrier in determining how the mobile device handles connections to the second radio access network.

2. The method of claim 1, wherein the mobile device selects the single carrier from the plurality of carriers using a rule, wherein the rule comprises any one of:

use a primary carrier of the plurality of aggregated carriers;

use the carrier with the highest or lowest cell index; and use the carrier with the largest bandwidth.

3. The method of claim 1, wherein the method further comprises the step of receiving an indication of the identity of a carrier and the step of obtaining information for, or pertaining to, each of two or more carriers in the first radio access network comprises obtaining information from the identified carrier.

4. The method of claim 1, the method further comprising, when the mobile device is camped on a carrier and in an idle mode, the step of obtaining information for, or pertaining to, the carrier the mobile device is camped on.

5. The method of claim 1, the method further comprising, when the mobile device is camped on a carrier and in an idle mode, the step of obtaining information for, or pertaining to, a carrier that the mobile device is not currently camped on.

6. The method of claim 5, wherein the carrier the mobile device is not currently camped on is a carrier the mobile device has previously been connected to or a neighboring carrier of the carrier the mobile device is currently camped on.

7. A mobile device configured for use in a first radio access network that uses a first radio access technology and a second radio access network that uses a second, different, radio access technology, wherein the mobile device is configured to aggregate a plurality of carriers in the first radio access network, the mobile device comprising:

a processing circuit configured to obtain information for, or pertaining to, each of two or more of the plurality of carriers in the first radio access network, wherein the obtained information for each of the two or more carriers comprises one or more threshold values and/or conditions for use in determining how the mobile device handles connections to the second radio access network, and to process the obtained information for only a single carrier to determine an action for the mobile device to take with respect to the second radio access network, wherein processing the obtained information for only the single carrier comprises using the one or more threshold values and/or conditions corresponding to the single carrier in determining how the mobile device handles connections to the second radio access network.

8. The mobile device of claim 7, wherein the processing circuit selects the single carrier from the plurality of carriers using a rule, wherein the rule comprises any one of:

use a primary carrier of the plurality of aggregated carriers;

use the carrier with the highest or lowest cell index; and use the carrier with the largest bandwidth.

9. The mobile device of claim 7, wherein the processing circuit is further configured to receive an indication of the identity of a carrier and to obtain information for, or pertaining to, the identified carrier.

10. The mobile device of claim 7, wherein the processing circuit is further configured to obtain information for, or pertaining to, the carrier the mobile device is camped on when the mobile device is camped on a carrier and in an idle mode.

11. The mobile device of claim 7, wherein the processing circuit is further configured to obtain information for, or pertaining to, a carrier that the mobile device is not currently camped on when the mobile device is camped on a carrier and in an idle mode.

12. The mobile device of claim 7, wherein the processing circuit is configured to determine whether to take one or more of the following actions:
 establishing or refraining from establishing a connection to the second radio access network;
 connecting to or disconnecting from the second radio access network;
 sending or refraining from sending measurement reports regarding the second radio access network to the first radio access network;
 steering traffic or refraining from the steering of traffic to the second radio access network;
 moving some or all of traffic from the second radio access network to the first radio access network;
 turning on or refraining from turning on a transceiver module for the second radio access technology in the mobile device;
 turning on or turning off a transceiver module for the second radio access technology in the mobile device;
 switching a transceiver module for the second radio access technology in the mobile device into or out of a power saving state or mode.

13. The mobile device of claim 7, wherein the action for the mobile device to take with respect to the second radio access network is further based on a state of the mobile device with respect to the second radio access network, such that different states can result in different actions, given the same threshold values and/or conditions.

14. A method in a network node of a first radio access network that uses a first radio access technology, for enabling a mobile device to selectively connect to and/or steer traffic to the first radio access network and a second radio access network that uses a second, different, radio access technology, the mobile device aggregating a plurality of carriers in the first radio access network, the method comprising:
 obtaining information for, or pertaining to, each of two or more of the plurality of carriers in the first radio access network, wherein the obtained information for each of the two or more carriers comprises one or more threshold values and/or conditions for use in determining how the mobile device handles connections to the second radio access network; and
 processing the obtained information for only a single carrier to determine an action for the mobile device to take with respect to the second radio access network, wherein processing the obtained information for only the single carrier comprises using the one or more threshold values and/or conditions corresponding to the single carrier in determining how the mobile device handles connections to the second radio access network.

15. The method of claim 14, wherein the step of obtaining information for, or pertaining to, each of two or more carriers in the first radio access network comprises measuring one or more signal quality parameters for the primary carrier for the mobile device.

16. The method of claim 14, wherein the step of processing comprises determining whether the mobile device is to take one or more of the following actions:
 establishing or refraining from establishing a connection to the second radio access network;
 connecting to or disconnecting from the second radio access network;
 sending or refraining from sending measurement reports regarding the second radio access network to the first radio access network;
 steering traffic or refraining from the steering of traffic to the second radio access network;
 moving some or all of traffic from the second radio access network to the first radio access network;
 turning on or refraining from turning on a transceiver module for the second radio access technology in the mobile device;
 turning on or turning off a transceiver module for the second radio access technology in the mobile device;
 switching a transceiver module for the second radio access technology in the mobile device into or out of a power saving state or mode.

17. A network node configured for use in a first radio access network that uses a first radio access technology, for enabling a mobile device to selectively connect to, and/or steer traffic to, the first radio access network and a second radio access network that uses a second, different, radio access technology, wherein the mobile device is configured to aggregate a plurality of carriers in the first radio access network, the network node comprising:
 a processing circuit configured to obtain information for, or pertaining to, each of two or more of the plurality of carriers in the first radio access network, wherein the obtained information for each of the two or more carriers comprises one or more threshold values and/or conditions for use in determining how the mobile device handles connections to the second radio access network, and to process the obtained information for only a single carrier to determine an action for the mobile device to take with respect to the second radio access network, wherein processing the obtained information for only the single carrier comprises using the one or more threshold values and/or conditions corresponding to the single carrier in determining how the mobile device handles connections to the second radio access network.

18. The network node of claim 17, wherein the network node selects the single carrier from the plurality of carriers using a rule, wherein the rule comprises any one of:
 use a primary carrier of the plurality of aggregated carriers;
 use the carrier with the highest or lowest cell index; and
 use the carrier with the largest bandwidth.

19. The network node of claim 17, wherein the processing circuit is configured to obtain information for, or pertaining to, each of two or more carriers in the first radio access network by measuring one or more signal quality parameters for the primary carrier for the mobile device.

20. The network node of claim 17, wherein the processing circuit is configured to process the obtained information to determine whether the mobile device is to take one or more of the following actions:
 establishing or refraining from establishing a connection to the second radio access network;
 connecting to or disconnecting from the second radio access network;
 sending or refraining from sending measurement reports regarding the second radio access network to the first radio access network;
 steering traffic or refraining from the steering of traffic to the second radio access network;
 moving some or all of traffic from the second radio access network to the first radio access network;
 turning on or refraining from turning on a transceiver module for the second radio access technology in the mobile device;

turning on or turning off a transceiver module for the second radio access technology in the mobile device;

switching a transceiver module for the second radio access technology in the mobile device into or out of a power saving state or mode.

* * * * *

UNITED STATES PATENT AND TRADEMARK OFFICE
CERTIFICATE OF CORRECTION

PATENT NO. : 10,912,001 B2
APPLICATION NO. : 14/917523
DATED : February 2, 2021
INVENTOR(S) : Bergstrom et al.

It is certified that error appears in the above-identified patent and that said Letters Patent is hereby corrected as shown below:

On the Title Page

Item (57), under "ABSTRACT", in Column 2, Line 2, delete "same According" and insert -- same. According --, therefor.

In the Specification

In Column 1, Line 45, delete "radio access network technologies (RATs)." and insert -- radio access technologies (RATs). --, therefor.

In Column 2, Line 12, delete ""user equipment,"" and insert -- "user equipments," --, therefor.

In Column 3, Line 28, delete "respectively)." and insert -- respectively. --, therefor.

In Column 4, Line 30, delete "first aspect" and insert -- first aspect, --, therefor.

In Column 4, Lines 39-41, delete "processing the . . . . . network." and insert the same at Line 38, after "and" as a continuation paragraph.

In Column 7, Lines 23-24, delete "application specific integrated circuit(s) (ASIC)" and insert -- application specific integrated circuit(s) (ASIC(s)) --, therefor.

In Column 10, Lines 8-9, delete "how to the" and insert -- how the --, therefor.

In Column 11, Line 12, delete "primary carrier (PCell)" and insert -- primary cell (PCell) --, therefor.

In Column 12, Lines 40-41, delete "primary carrier (PCell)" and insert -- primary cell (PCell) --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,912,001 B2

In Column 15, Line 27, delete "load)." and insert -- load. --, therefor.

In Column 16, Line 55, delete "RSRP 3GPP_carrier_B" and insert -- RSRP_3GPP_carrier_B --, therefor.

In Column 18, Line 31, delete "A method of 1," and insert -- The method of 1, --, therefor.